(12) United States Patent
Schumann et al.

(10) Patent No.: US 11,807,349 B1
(45) Date of Patent: Nov. 7, 2023

(54) SUBMERSIBLE REMOTE OPERATED VEHICLE VISION ASSISTANCE AND CONTROL

(71) Applicant: FMC Technologies, Inc., Houston, TX (US)

(72) Inventors: Blake Schumann, Katy, TX (US); Mark Leonhardt, Sacramento, CA (US); Alex Wendeborn, Spring, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 17/932,988

(22) Filed: Sep. 16, 2022

(51) Int. Cl.
| | |
|---|---|
| *B63G 8/38* | (2006.01) |
| *G06T 7/50* | (2017.01) |
| *G06T 7/73* | (2017.01) |
| *G05D 1/08* | (2006.01) |
| *E21B 41/04* | (2006.01) |
| *E21B 33/035* | (2006.01) |
| *B63G 8/00* | (2006.01) |

(52) U.S. Cl.
CPC ............... *B63G 8/38* (2013.01); *B63G 8/001* (2013.01); *E21B 33/035* (2013.01); *E21B 41/04* (2013.01); *G05D 1/0875* (2013.01); *G06T 7/50* (2017.01); *G06T 7/74* (2017.01); *G06T 2207/30204* (2013.01)

(58) Field of Classification Search
CPC .. B63G 8/38; B63G 8/001; G06T 7/74; G06T 7/50; E21B 33/035; E21B 41/04; G05D 1/0875
USPC ........................................................ 701/21
See application file for complete search history.

(56) References Cited

U.S. PATENT DOCUMENTS

| | | |
|---|---|---|
| 3,381,485 A | 5/1968 | Crooks et al. |
| 8,900,106 B2 | 12/2014 | McCoy, Jr. |
| 10,442,025 B2 | 10/2019 | Jones et al. |
| 10,751,872 B2 | 8/2020 | Pettersen et al. |
| 11,235,890 B1 | 2/2022 | Dahlstrom |
| 2011/0043515 A1 | 2/2011 | Stathis |
| 2012/0298706 A1 | 11/2012 | Gordon et al. |

(Continued)

FOREIGN PATENT DOCUMENTS

| | | |
|---|---|---|
| GB | 2365895 | 2/2002 |
| JP | H0631670 | 2/1994 |

(Continued)

OTHER PUBLICATIONS

[No Author Listed], "HaloCAM Presentation," believed to be available no later than Sep. 16, 2022, retrieved on Sep. 22, 2022, 11 pages.

(Continued)

*Primary Examiner* — Yazan A Soofi
(74) *Attorney, Agent, or Firm* — Fish & Richardson P.C.

(57) ABSTRACT

This disclosure describes monitoring and operating subsea well systems, such as to perform operations in the construction and control of targets in a subsea environment. A submersible ROV that performs operations in the construction and control of targets (e.g., well completion components) in a subsea environment, the ROV has one or more imaging devices that capture data that is processed to provide information that assists in the control and operations of the ROV and/or well completion system while the ROV is subsea.

21 Claims, 14 Drawing Sheets

(56) References Cited

U.S. PATENT DOCUMENTS

| | | | |
|---|---|---|---|
| 2013/0014688 A1 | 1/2013 | Yemington | |
| 2014/0090506 A1 | 4/2014 | Tobey | |
| 2014/0147217 A1* | 5/2014 | Ammerlaan | E02B 17/04 |
| | | | 405/203 |
| 2015/0367510 A1 | 12/2015 | Naitou et al. | |
| 2017/0072563 A1* | 3/2017 | Anderson-Sprecher | |
| | | | G05D 1/0274 |
| 2017/0095937 A1 | 4/2017 | Williams et al. | |
| 2017/0217021 A1 | 8/2017 | Hoffman et al. | |
| 2017/0285202 A1 | 10/2017 | Fyffe et al. | |
| 2017/0370173 A1 | 12/2017 | Gable et al. | |
| 2018/0003008 A1* | 1/2018 | Osen | E21B 33/035 |
| 2018/0251199 A1* | 9/2018 | Radford | B25J 11/00 |
| 2019/0033080 A1* | 1/2019 | Petrosky | G06T 7/73 |
| 2019/0111575 A1 | 4/2019 | Asano et al. | |
| 2020/0122331 A1* | 4/2020 | Jules | B25J 9/1682 |
| 2020/0317311 A1 | 10/2020 | Correll et al. | |
| 2020/0317312 A1* | 10/2020 | Leonhardt | B25J 9/1633 |
| 2021/0108480 A1* | 4/2021 | Galle | E21B 19/16 |
| 2022/0230339 A1* | 7/2022 | Arshad | G06T 7/73 |

FOREIGN PATENT DOCUMENTS

| | | |
|---|---|---|
| KR | 100986215 B1 | 10/2010 |
| KR | 1020130000008 A | 1/2013 |
| KR | 1020130068430 A | 6/2013 |
| KR | 1020220099657 | 7/2022 |
| NO | 326675 B1 | 2/2002 |
| WO | WO 2003040602 | 5/2003 |
| WO | WO 2013050051 | 4/2013 |
| WO | WO 2018057344 | 3/2018 |
| WO | WO2018145917 A1 | 8/2018 |

OTHER PUBLICATIONS

[No Author Listed], "HaloCAM_Brochure," believed to be available no later than Sep. 16, 2022, retrieved on Sep. 22, 2022, 3 pages.

[No Author Listed], "Schilling Robotics GEMINI® ROV System," believed to be available no later than Sep. 16, 2022, 2 pages.

International Preliminary Report on Patentability in International Appln. No. PCT/US2020/026638, dated Oct. 14, 2021, 7 pages.

Offshore-mag.com [online], "TechnipFMC launches advanced Gemini ROV system," Nov. 2020, retrieved on Sep. 22, 2022, retrieved from URL <https://www.offshore-mag.com/business-briefs/equipment-engineering/article/14185192/technipfmc-launches-advanced-gemini-rov-system>, 14 pages.

PCT International Search Report and Written Opinion in International Application No. PCT/US2020/026,638, dated Jul. 23, 2020, 11 pages.

Zuput.com, [online] "HALOCAM", believed to be available no later than Sep. 16, 2022, retrieved on Sep. 22, 2022, retrieved from URL <https://zupt.com/services/halocam-202110071900>, 1 page.

Carreras et al., "Intervention Payload for Valve Turning with an AUV," InComputer Aided Systems Theory-EUROCAST 2015: 15th International Conference, Las Palmas de Gran Canaria, Spain, Feb. 8-13, 2015, Revised Selected Papers 15 2015, Springer International Publishing, 7 pages.

Invitation to Pay Additional Fees and, Where Applicable, Protest Fees in International Appln. No. PCT/US2022/076571, dated May 10, 2023, 13 pages.

Palomeras et al., "I-AUV docking and intervention in a subsea panel," IEEE, SJ International Conference on Intelligent Robots and Systems, Sep. 14-18, 2014, 7 pages.

Santos et al., "A Monocular Hybrid Visual Servoing Controller for Underwater Inspection on Work-class ROVs," InOCEANS 2021: San Diego-Porto, IEEE, Sep. 20, 2021, 6 pages.

* cited by examiner

SUBMERSIBLE REMOTE OPERATED VEHICLE VISION ASSISTANCE AND CONTROL

TECHNICAL FIELD

This disclosure describes controlling a submersible remote operated vehicle (ROV).

BACKGROUND

In petrochemical exploration and production, many offshore wells are at depths well beyond the reach of divers. In these instances, a submersible remote operated vehicle (ROV) is controlled from above the water's surface to perform some operations in the construction and control of the wells. An ROV performs various tasks in petrochemical exploration that utilize precise control of the ROV and one or more manipulator arms to ensure the tasks are performed properly and safely. The precise control of the ROV is challenging in a subsea environment, and improper control of the ROV can cause operational delays.

SUMMARY

This disclosure describes monitoring and/or operating industrial systems, such as to perform operations in the construction and control of targets in an industrial environment, such as subsea well systems, offshore wind systems, subsea mining systems, energy production and collection systems, oil and gas extraction, and others. In particular implementations, an ROV that has one or more imaging devices that capture data that is processed to provide information that assists in the control and operations of the ROV while the ROV is subsea. Particular examples described herein include a ROV to perform operations in the construction and control of targets (e.g., well completion components) in a subsea environment. The ROV has one or more imaging devices that capture data that is processed to provide information that assists in the control and operations of the ROV and/or well completion system while the ROV is subsea.

Some aspects described herein include a submersible ROV that can identify target interfaces and tools using fiducial markers located at the identified target to facilitate streamlined operations at the identified target. For example, the submersible ROV can utilize fiducial markers to determine an interface location and to identify operating parameters at the target location. Optionally, the submersible ROV can analyze information from the fiducial to automate operations of the submersible ROV. For example, the submersible ROV can utilize the fiducial information and location to perform subsea operations such as tooling identification and exchange, operate an interface based on location and operating parameters determined based on the fiducial information, and/or perform other automated procedures. In some aspects, the fiducial information can facilitate retrieval of information useful in carrying out an automated procedure (e.g., requiring limited or no involvement by a human operator), and/or guide the submersible ROV while carrying out an automated procedure.

Some example aspects described herein include a system that identifies, maintains, and/or extracts interface and operational historical data logs. The system can track and store operational parameters that provide historical operational parameters associated with one or more identified interfaces, operations, items of subsea equipment, etc. The historical operational parameters can facilitate improved operations at the identified interface(s) by providing information to the system regarding the parameters that have been previously encountered at the identified interface(s). The historical operational parameters can be provided in real time during operations to facilitate improved operational efficiency by providing the historical parameters. In some aspects, the historical operational parameters can reduce trial-and-error and/or uncertainty regarding expected operational parameters (e.g., an expected torque required to operate an interface). Alternatively or additionally, the historical operational parameters can be used to determine and monitor maintenance schedules, and/or to predict maintenance needs, improving overall system reliability and preventing unexpected operational challenges over the life of an item of subsea equipment.

Some aspects described herein include a system that facilitates installation/orientation of subsea assets (e.g., installation/orientation of a subsea tree) by facilitating an objective determination of positioning and orientation of the subsea assets during installation. The system can utilize predetermined and tracked orientation information of the submersible ROV and tracking of fiducial markers of the subsea assets to determine the orientation and positioning of the subsea assets during installation, after installation (e.g., contemporaneously with an installation operation), and over the life of subsea assets subsequent to installation. The determined orientation and positioning can be used to ensure the orientation and positioning of the subsea assets conform to a predetermined specified orientation and positioning, and/or to provide an objective measure of orientation and positioning that can be logged, monitored over time, and/or utilized in future operations. In some aspects, the determination provides an objective measure of position and/or orientation that is readily repeatable (e.g., the measure of position and/or orientation is based on little or no subjective/human observations).

In an example embodiment, a subsea equipment operating and management system for operating and managing an item of subsea equipment is provided. The subsea equipment operating and management system includes a fiducial marker, a camera configured to be carried by a submersible ROV, the camera configured to obtain fiducial data from the fiducial marker via the sensor when the fiducial marker is attached to an item of subsea equipment. The subsea equipment operating and management system also includes a processor and memory with instructions stored on the memory operable to cause the system to perform operations that may include: analyze the fiducial data to obtain operational information about the item of subsea equipment, the operational information including an interface identification.

Implementations may include one or more of the following features. The subsea equipment operating and management system where the sensor is a video camera. The user-interface display is configured to display a video feed captured by the video camera, where the user-interface display is configured to display an augmented graphic including the operational information overlaying the video feed. The operational information includes an operating parameter associated with an interface. The operating parameter includes a rated torque value for operating the interface. The operating parameter includes a historic torque value required to operate the interface during a previous operation. The operating parameter includes one or more of a turns value, pressure value, a pH value, or volume value. The fiducial data identifies a database location where the operational information is stored. The database is located on the submersible ROV. The database is located remote from the submersible ROV and item of equipment. The submersible ROV is configured to automatically engage with the interface using the fiducial data. The user interface includes a prompt to a human operator to initiate the automatic engagement with the interface. The user interface includes a prompt to a human operator to select a fiducial marker from multiple fiducial markers within a field of view on the user interface. Implementations of the described techniques may include hardware, a method or process, or computer software on a computer-accessible medium.

In an example embodiment, a method of performing a subsea operation using a submersible ROV is provided. The method includes capturing one or more fiducial markers at a subsea target by an imaging device of a submersible ROV; identifying an interface of the subsea target based on the fiducial marker; analyzing the fiducial data to obtain operational information about the item of subsea equipment, the operational information associated with the interface; and actuating the interface based on the operational information by engaging the submersible ROV with the interface.

Implementations may include one or more of the following features. The method where identifying an interface of the subsea target based on the fiducial marker may include determining a location of the interface relative to the fiducial marker. Identifying an interface of the subsea target based on the fiducial marker may include determining an operating parameter of the interface. The operating parameter includes a rated torque value for operating the interface or a historic torque value for operating the interface. Actuating the interface may include automatically actuating the interface in response to input by a human operator to initiate the automatic engagement with the interface, the input received before the submersible ROV is engaged with the interface. Implementations of the described techniques may include hardware, a method or process, or computer software on a computer-accessible medium.

In an example embodiment, a subsea equipment and management system is provided. The subsea equipment and management system includes means for capturing one or more fiducial markers at the subsea target by a submersible ROV; means for identifying an interface of the subsea target based on the fiducial marker, the submersible ROV configured to actuate the interface based on information obtained via the fiducial marker.

Implementations may include one or more of the following features. The subsea equipment and management system where the information includes an operating parameter.

In an example embodiment, a system including a processor and memory with instructions stored on the memory operable to cause the system to perform operations comprising receive data from a submersible ROV, the data includes an image that includes an alignment fiducial captured by a camera of the ROV. The operations include analyze fiducial data from the alignment fiducial of the image, the fiducial data including one or more interface identifications and interface position information for each of the one or more interface identifications. The operations include automatically control, based on the fiducial data, movement of an arm of the ROV to engage with components of the interface based on the interface position information.

Implementations may include one or more of the following features. The system where the operations further may include: communicating the fiducial data to a user-interface display at a location remote from the submersible ROV, where the user-interface display is configured to display a video feed captured by the camera, the user-interface display is configured to display an augmented graphic including the operational information overlaying the video feed. The interface position information includes the position of one or more interfaces with respect to the alignment fiducial. The interface position information includes an interface map that stores one or more positions of operable interfaces at the subsea target with respect to the alignment fiducial. The fiducial data identifies a database location where the operational information is stored. The submersible ROV is configured to automatically engage with the interface using the fiducial data. A user interface includes a prompt to a human operator to initiate the automatic engagement with the interface. A user interface includes a prompt to a human operator to select a fiducial marker from multiple fiducial markers within a field of view on the user interface. Implementations of the described techniques may include hardware, a method or process, or computer software on a computer-accessible medium.

In an example embodiment, a method of performing a subsea operation using a submersible ROV. The method includes receiving data from a submersible ROV, the data may include an image that includes an alignment fiducial captured by a camera of the ROV. The method also includes analyzing fiducial data from the alignment fiducial of the image, the fiducial data including one or more interface identifications and interface position information for each of the one or more interface identifications. The method also includes automatically controlling, based on the fiducial data, movement of an arm of the ROV to engage with components of the interface based on the interface position information.

Implementations may include one or more of the following features. The method may include: communicating the fiducial data to a user-interface display at a location remote from the submersible ROV, where the user-interface display is configured to display a video feed captured by the camera, the user-interface display is configured to display an augmented graphic including the operational information overlaying the video feed. The interface position information includes the position of one or more interfaces with respect to the alignment fiducial. The interface position information includes an interface map that stores one or more positions of operable interfaces at the subsea target with respect to the alignment fiducial. The fiducial data identifies a database location where the operational information is stored. The database is located on the submersible ROV. The database is located remote from the submersible ROV and item of equipment. The method may include automatically engaging with the interface using the fiducial data. The method may include logging operational parameters from the interface during engagement with the interface. The operational parameters are logged in a database located on the submersible ROV. Implementations of the described techniques may include hardware, a method or process, or computer software on a computer-accessible medium.

In an example embodiment, a subsea equipment operating and management system for operating and managing an item of subsea equipment using a submersible ROV is provided. The system includes a fiducial marker configured for attachment to an item of subsea equipment. The system also includes a sensor configured to be connected to the submersible ROV, the sensor configured to obtain fiducial data from the fiducial marker. The system also includes a processor and memory with instructions stored on the memory operable to cause the system to perform operations may include: log operational information associated with the item of subsea equipment contemporaneously with engagement of the item of subsea equipment.

Implementations may include one or more of the following features. The subsea equipment and management system where the operational information includes identification of an interface of the item of subsea equipment engaged by the submersible ROV during an operation. The operational information is associated with the item of equipment in the database based on the fiducial data obtained from the fiducial marker. The operational information is retrievable from the database based on an identifier of the item of equipment. The operating parameter includes a torque value used to operate the interface or a number of turns used to operate the interface. The operating information includes submersible ROV parameters, including position, orientation, and tool configuration. The operating information includes environmental parameters, including depth, temperature, or pressure. The operational parameters include a time of the operation, a type of operation, and an operating parameter. The operational parameters are logged in a database located on the submersible ROV. The operational parameters are logged in a database located remote from the item of subsea equipment and the submersible ROV. The subsea equipment and management system may include a user-interface that displays historical operating information obtained during a prior operation associated with the item of subsea equipment while the submersible ROV performs an operation associated with the item of subsea equipment. The historical operating information includes a torque value used to operate the interface or a number of turns used to operate the interface. The processor and memory with instructions stored on the memory are operable to cause the system to prompt a user to initiate a maintenance operation based on historical operational information logged to the database during a prior operation. The processor and memory with instructions stored on the memory are operable to cause the system to initiate the maintenance operation in response to a user input to initiate the maintenance operation. Implementations of the described techniques may include hardware, a method or process, or computer software on a computer-accessible medium.

In an example embodiment, a method of performing a subsea operation is provided. The method includes capturing one or more fiducial markers at the subsea target by an imaging device of a submersible ROV; and logging, contemporaneously with an operation at the subsea target, operational information based on fiducial data obtained via the fiducial marker.

Implementations may include one or more of the following features. The method where logging may include associating the operational information with the subsea target in a database remote from the subsea target. The database is located on the submersible ROV. The database is located at a server remote from the submersible ROV and the subsea target. The operational parameters include a time of the operation, a type of operation, and an operating parameter. The operating information includes submersible ROV parameters, including position, orientation, and tool configuration. Implementations of the described techniques may include hardware, a method or process, or computer software on a computer-accessible medium.

In an example embodiment, a subsea equipment operating and management system for operating and managing an item of subsea equipment using a submersible ROV is provided. The system includes a fiducial marker, a submersible ROV, the submersible ROV may include a manipulator arm and a sensor, the submersible ROV configured to obtain fiducial data from the fiducial marker via the sensor. The system also includes a processor and memory with instructions stored on the memory operable to cause the system to perform operations that may include: monitor an orientation and position of the ROV, calculate an orientation and position of the fiducial marker, determine a first orientation and position of the item of subsea equipment based on the orientation and position of the fiducial marker and the orientation and position of the ROV.

Implementations may include one or more of the following features. The subsea equipment operating and management system where the item of subsea equipment may include a subsea tree. The item of subsea equipment may include a conductor housing. The item of subsea equipment may include a tubing head. The sensor is a machine vision camera. The method may include: determining, responsive to a determination that the uninstalled subsea target is not within the specified orientation, a difference between the determined orientation and position and the specified orientation and position. The method may include: sending, responsive to a determination that the uninstalled subsea target is within the specified orientation and position range, operations instructions to finalize the installation of the subsea target. Calculating the orientation and position of the fiducial marker may include detecting a distance to the fiducial marker, calculating an angle of the fiducial marker in relation to a primary fiducial marker, and detecting an orientation of the fiducial marker. The subsea equipment operating and management system the operations may include: determine, whether the uninstalled subsea target is within a specified orientation. The subsea equipment operating and management system the operations may include: determine, responsive to a determination that the uninstalled subsea target is not within the specified orientation, a difference between the determined orientation and position and the specified orientation and position. The method may include: performing the operations instructions to adjust the orientation and position of the uninstalled subsea target. The method may include: sending operations instructions to at least one of the ROV and a vessel to adjust the orientation and position of the uninstalled subsea target. The subsea equipment operating and management system the operations may include: after the subsea target has been installed, determine whether the installed subsea target is within a specified orientation. The subsea equipment operating and management system the operations may include: determine, responsive to a determination that the uninstalled subsea target is not within the specified orientation, a difference between the determined orientation and position and the specified orientation and position. The subsea equipment operating and management system the operations may include: determine a second orientation and position of the item of subsea equipment based on the orientation and position of the fiducial marker and the orientation and position of the ROV at a second time subsequent to the first orientation and position. The subsea equipment operating and management system the operations may include: determine a difference between the first orientation and the second orientation of the item of subsea equipment. The item of subsea equipment is a blowout preventer (BOP). The tracked ROV navigation parameters include at least one of a depth, an altitude, an orientation angle, a pitch, a roll, a yaw, and an inclination of the ROV. Calculating the orientation and position of the fiducial marker may include correlating the detected distance, angle, and orientation of the fiducial marker to one or more tracked ROV navigation parameters. Implementations of the described techniques may include hardware, a method or process, or computer software on a computer-accessible medium.

In an example embodiment, a method of performing a subsea operation is provided. The method includes capturing one or more fiducial markers at an uninstalled subsea target by an imaging device of a submersible ROV; calculating an orientation and position of the fiducial marker, determining an orientation and position of the uninstalled subsea target based on the orientation and position of the fiducial marker, determining if the orientation and position of the uninstalled subsea target is within a specified orientation and position range.

The devices, systems, and techniques described herein may provide one or more of the following advantages. First, some aspects described herein provide a rich array of operational information to facilitate efficient operation of a submersible ROV. The array of operational information can facilitate faster operations by providing operators (e.g., human operators, computer-controlled operators, etc.) with information regarding subsea targets in real time as the subsea targets are encountered.

Second, some aspects described herein provide increased automation of individual subsea operations and sequences of operations. Individual operations and sequences of operations can be performed by a click or push of a button by an operator at a control interface that facilitates automated operations that are controlled by the system. The increased automation of operations can reduce reliance on an individual operator, reduce the training required for each operator, and facilitate enhanced reliability of the subsea system by reducing deviation between human operators, for example. Ultimately, enhanced reliability facilitated by automated operations can reduce operational risk, and limit production downtime and/or costly subsea repairs.

Third, some aspects provide reduced maintenance costs of the subsea system by facilitating access to a rich array of equipment history. The equipment history may be accurately tracked and/or logged each time a subsea target is operated/manipulated. For example, the historical data from each operation is automatically logged and stored by the system. The historical data is readily available to an operator and/or ROV during subsequent operations involving the same subsea target, operation, etc. In some aspects, maintenance can be performed in less time and with increased precision based on tracked historical data that is readily available each time the target is encountered.

Fourth, some aspects provide improved bookmarking of captured subsea video for indexing operations. The captured video by one or more imaging devices can automatically capture assets, tools, interfaces, operational parameters (e.g., how much torque applied), time, etc., and can log the information for subsequent retrieval. The logged information can be stored as the indexed video and/or can be logged by any of the parameters, including by asset, tools, interfaces, operational parameters, time, etc.

Fifth, some aspects facilitate improved safety of subsea operations and prevent undesirable operational outcomes by providing administrative lockouts on particular interfaces that may rarely be operated. An operator may be notified regarding the lockout at the interface before being allowed to operate an interface or initiate an automated operation associated with the interface. Alternatively or additionally, interacting with particular interfaces or initiating particular automated operations may require approval of an authorized personnel. In some aspects, the administrative notification/confirmation and/or lockout can reduce operator error and prevent unintended and/or undesirable operational outcomes, further enhancing overall system reliability and performance.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
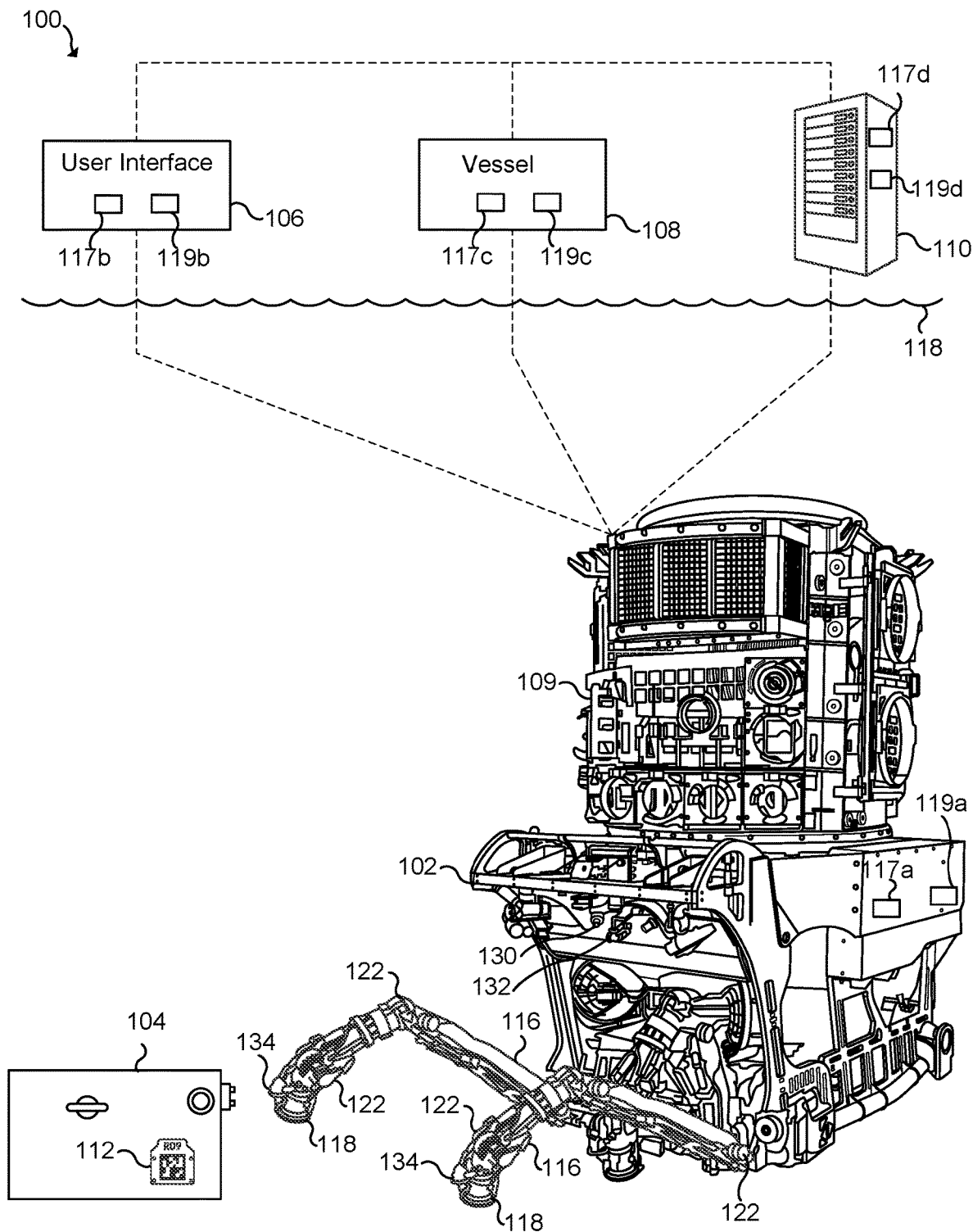
FIG. 1 shows a perspective view of an example system that includes an ROV that facilitates industrial installation and production.

Referring to FIG. 1, an example system 100 for subsea installation and production is shown. Example system 100 includes a submersible remote operated vehicle (ROV) 102, one or more subsea targets 104, such as an item of equipment associated with a subsea well, a user interface 106, a vessel 108, and/or a server 110 that are in communication with the ROV 102. The ROV 102 is navigated to the subsea target 104, and the ROV 102 interacts with a fiducial marker, such as a fiducial marker 112, associated with the subsea target 104. In some examples, the submersible ROV 102 utilizes the fiducial marker 112 to extract information about the subsea target 104 including location/position information associated with the subsea target 104 or an interface of the subsea target 104, and operating parameters at the subsea target 104. The extracted information is communicated between the ROV 102, the user interface 106, the vessel 108, and/or the server 110 to facilitate operation of the subsea target 104 and/or the ROV 102 relative to the subsea target 104.

The ROV 102 is controlled by an automated or semi-automated control system and/or a human operator that interacts with the user interface 106. In some aspects, the user interface 106 and the human operator are remotely located from the ROV 102. For example, the user interface 106 and the human operator can be positioned on the vessel 108 (e.g., a platform, ship or other vessel) that is located above the surface 114 of a body of water, or at a remote location on shore (e.g., a location of server 110). The operator monitors and/or controls the ROV 102 via the user interface 106 to move about the subsea environment (e.g., travel to and around subsea target 104) and to perform operations.

The ROV 102 includes a tool carousel 109 that carries various tools that are attachable and exchangeable with each of the manipulator arms 116. In various example aspects, the ROV 102 provides a highly stable, powerful work platform suitable for complex deep-water intervention tasks in oil and gas developments. The system 100 is adapted to perform tasks associated with drill support and completion activities, including simultaneous vertical and horizontal thrust and high-capacity hydraulic tooling interfaces.

The ROV 102 includes two manipulator arms 116. Each manipulator arm 116 has one or more tools 118 that are attachable to the ends of each arm 116. The manipulator arms 116 have multiple joints 122, each joint is configured to pivot and/or rotate to enable the manipulator arms 116 to be adjustable in multiple degrees of freedom. Each manipulator arm 116 has joints 122 that provide 6 degrees of freedom (i.e., movement along the X-axis, Y-axis, Z-axis, roll, pitch, and yaw). The joints 122 include mechanical joints that enable movement between multiple connected segments of the arm 116, one or more actuators to drive movement of the joint and, in certain instances, one or more sensors, such as position and force (linear and/or torque) sensors.

The ROV 102 includes at least one processor 117a and at least one memory 119a, and various sensors, such as imaging devices, which are utilized in the navigation and operation of the ROV 102. For example, the ROV 102 includes a forward facing camera 130 and a downward facing camera 132 that are positioned between the two manipulator arms 116 (e.g., at the center of the ROV 102). The ROV 102 includes an aft camera that faces rearward, the aft camera can be positioned similarly to the forward facing camera 130 on an opposite (aft) side of the ROV 102. Each manipulator arm 116 includes a wrist camera 134 positioned at a wrist of the manipulator arm 116.

The various imaging devices can be streamed in real time to the user interface 106, the vessel 108, and/or the server 110 to facilitate remote operations of the ROV 102. Each of the ROV 102, the user interface 106, the vessel 108 and/or the server 110 include a processor and a memory (e.g., similar to processor 117a and memory 119a) for performing various operations described herein. For example, the user interface 106 includes a processor 117b and a memory 119b, the vessel includes a processor 117c and a memory 119c, and/or the server includes a processor 117d and a memory 119d. The video and/or imaging feed from each imaging device can be displayed at the user interface 106, alone or together with multiple feeds from the various imagining devices. Alternatively or additionally, the feeds of one, some, or all imaging devices are recorded for future reference and analysis. The recorded video feeds are stored on memory 119a at the ROV 102, at the vessel 108, at the server 110, and/or another location, (e.g., for later upload to a database and/or memory 119b, 119c, 119d located at the user interface 106, the vessel 108, the server 110, and/or another location, etc.), or transmitted (e.g., in real-time) to a remote location such as the vessel 108, the server 110, or another location, etc. As described in more detail herein, the video feed can be augmented with various information as a heads-up display to facilitate monitoring and/or operation of the ROV 102.

In an example, one or more of the imaging devices include machine vision cameras that use a combination of software and hardware. For example, the machine vision cameras include (e.g., and/or are connected to, directly or indirectly) at least one processor 117 and at least one memory 119 that stores instructions for various subsea operations described herein. In some aspects, the machine vision cameras include digital sensors and specialized optics to acquire images, so that the systems provided herein can process, analyze, and measure various characteristics for decision making during the subsea processes. One or more of the imaging devices provide wide angle views, standard angle views, high-definition color output, black and white debug views (e.g., to facilitate tracking recognition), fixed focal length and aperture, and adjustable/dimmable lighting. In an example, the ROV 102 includes a high-definition color camera, a machine vision camera, a miniature color camera, such as the GREYTIP SHARK subsea camera available from Imenco AS, and a low light black and white camera, such as the NIGHT SHARK camera available from Imenco AS. In various example aspects, the ROV 102 includes lighting to facilitate visibility in low-light or murky environments. The ROV 102 includes multiple lights (e.g., that can be individually/selectively controlled) to generate a desired light output. In some aspects, the ROV 102 includes multiple 24 VDC LED lights and multiple 120 VAC LED flood lights.

The ROV 102 is navigated to the subsea target 104 (e.g., via automated control and/or input by an operator received at the user interface 106), and one or more of the imaging devices are directed at the target 104. For example, the ROV 102 is navigated proximate the subsea target 104 such that the forward facing camera 130 and/or the wrist camera 134 are directed at the target 104. At least one of the forward facing camera 130 and the wrist camera 134 are adjusted (e.g., by the operator and/or automatically by the ROV 102) until the fiducial marker 112 is recognized by at least one of the forward facing camera 130 and the wrist camera 134.

The fiducial marker 112 provides information regarding the subsea target 104. For example, the fiducial marker 112 facilitates identification of what the subsea target 104 is, such as the name or type of subsea equipment or a particular identifier of the subsea target. For example, the fiducial marker 112 facilitates a determination that the subsea target 104 is a tool holder, a subsea tree, riser, tubing head, conductor housing, umbilical, blowout preventer (BOP), wellhead, manifold, jumper, flowline, etc., and/or an operational interface that includes hot stab ports, valves, other operational interfaces, etc. associated with the subsea target 104. Determination of the subsea target 104 via the fiducial marker 112 facilitates efficient and accurate identification of the subsea target 104 and its interfaces, promoting operational effectiveness and reliability in carrying out operations by the ROV 102.

Alternatively or additionally, the fiducial marker 112 facilitates determination of operational information associated with the subsea target 104 that the fiducial marker 112 is associated with (e.g., affixed to). In an example aspect, the operational information includes an operating parameter associated with an interface of the subsea target 104, such as a rated torque value for operating the interface, a rated number of turns for operating the interface, pressure, volume, force, voltage, current, pH readings, optical properties, etc. In some aspects, the operational information includes specified or expected values. Alternatively or additionally, the operational information includes historical values measured during a previous operation, or historical averages obtained based on previous measured values, associated with the subsea target 104 or the particular interface of the subsea target 104. For example, the operational information includes one or multiple historic torque values required to operate the interface during one or multiple previous operations, which in some scenarios may more accurately reflect an expected torque value required to operate the interface. For example, an expected torque value may deviate from an original specified value due to damage or wear over the life of the interface, or due to environmental or operational characteristics. A historical torque value, such as a torque value required in a previous operation, an average of torque values required in multiple previous operations, or a calculated expected torque value based on historical torque values (e.g., based on a trend in a change in torque value over multiple historical values), can be used to inform a current operation.

In an example aspect, the fiducial marker 112 serves as a bookmark to the information regarding the subsea target 104. For example, information regarding the subsea target 104 is stored remote from the fiducial marker 112, and the fiducial marker 112 provides the location of the information (e.g., in a database stored at the ROV 102, the vessel 108, the server 110, another location, etc.). In an example aspect, information associated with multiple subsea targets 104, and multiple interfaces of each of the subsea targets 104, is stored locally at the ROV 102. The forward facing camera 130, wrist camera 134, and/or one or more other cameras of ROV 102 includes a machine vision camera that includes memory that stores the operational information. The fiducial marker is recognized by the machine vision camera and provides an address, bookmark, pointer, etc., to information stored in the memory of the machine vision camera. Alternatively or additionally, the information regarding the subsea target 104 is stored in memory elsewhere on the ROV 102, at the vessel 108, at the server 110, and/or at another location remote from the ROV 102. The information is communicated to the user interface 106 and/or the ROV 102 (e.g., in real time) to facilitate operations of the ROV 102 based on the information.

In some aspects, the fiducial marker 112 serves as an asset identifier that identifies the subsea target 104, such as a name, type, unique identifier, etc., of the subsea target 104, and a data sheet or data repository associated with the subsea target 104 and/or an interface of the subsea target 104. The data sheet/repository can be retrieved by the ROV 102, operator, etc. from any number of databases where the data sheet/repository is stored such as at the vessel 108, at the server 110, and/or another location.

The information stored in memory is populated and updated so that accurate information is obtained when a fiducial is recognized. For example, information associated with a particular subsea target 104 is populated before, during, or after installation of the subsea target 104. Information may be loaded into the memory of the camera when the ROV 102 is at a surface location (e.g., on the vessel 108, on shore, etc.), or delivered to the ROV 102 via a communication link. In some aspects, a fiducial marker 112 that can be used as a bookmark or identifier of information in a remote database facilitates accurate and up-to-date information. The fiducial marker 112 can be affixed (e.g., permanently) to the subsea target 104, such as at the surface during manufacture of the subsea target 104, and maintained on the subsea target 104 when the subsea target 104 is installed in a subsea location. The database storing information about the subsea target 104, including historical operational information associated with the subsea target 104 and one or more of its interfaces, can be updated over the life of the subsea target 104 while the fiducial marker 112 remains unchanged. For example, as described in more detail herein, operation information including historical operating parameters, can be stored in the database at a location associated with the fiducial marker 112 (e.g., associated with an identifier of the fiducial marker 112, associated with the subsea target 104 identified by the fiducial marker 112, etc.).

Alternatively or additionally, the fiducial marker 112 itself provides information regarding the subsea target 104. For example, the fiducial marker 112 is encoded to identify the subsea target 104, its interface(s), and/or operational information. The information can be retrieved by one or more sensors of the ROV 102, such as its camera, and used by the ROV 102, transmitted to the user interface 106 or other component of system 100, and used to facilitate operation by ROV 102.

The ROV 102 analyzes information from the fiducial marker 112 to facilitate improved operations of the ROV 102 and/or to automate operations of the ROV 102. For example, the operator at the user interface 106 utilizes information from the fiducial marker 112 to perform subsea operations such as tooling identification and exchange, operate an interface based on location and operating parameters determined based on the fiducial information, and/or perform other automated procedures, as described in more detail below.

Figure 2:
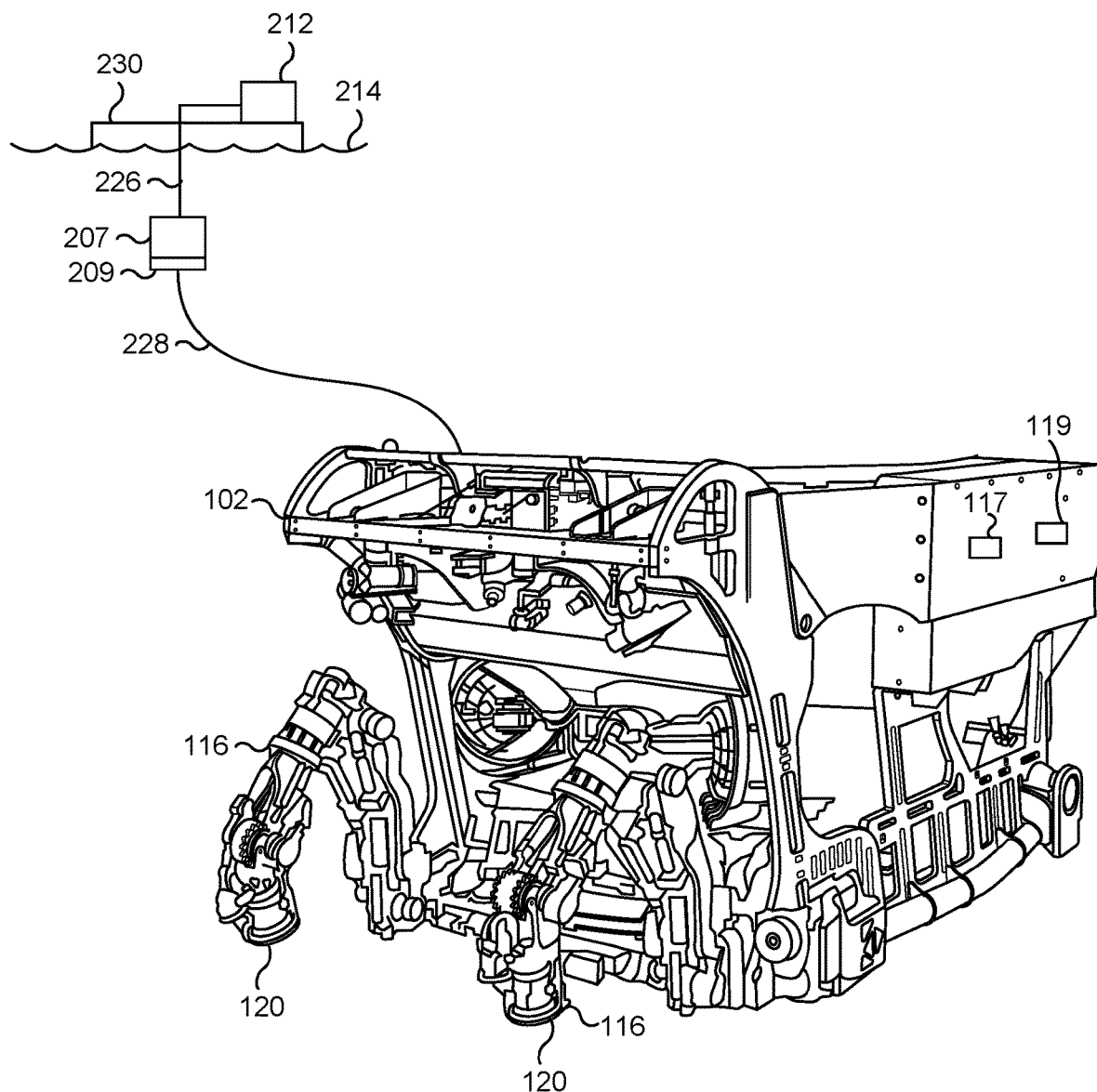
FIG. 2 shows an example submersible remote operated vehicle (ROV) operating subsea.

FIG. 2 shows another example of the ROV 102 operating subsea. The ROV 102 can be monitored and/or controlled by a human operator from a control interface 212 positioned on a vessel 230 (e.g., a platform, ship or other vessel) above a surface 214 of a body of water or on a remote land location, to fly through the water and perform operations related to observation, maintenance, or operation, for example, of an item of subsea equipment, such as subsea target 104 (FIG. 1). In various example aspects, the control interface 212 includes one or more features of the user interface 106 described above. The ROV 102 includes two manipulator arms 116 with a tool attached to the end of each arm 116.

The control interface 212 is communicably coupled to the ROV 102 submerged in the water. In some cases, the ROV 102 is connected to the control interface 212 through a tether management system (TMS) 207, also at least partially submerged in the water, and supported from the vessel 230. The operator monitors and/or controls the ROV 102 to travel in the subsea environment and perform operations via the control interface 212.

The control interface 212 at the vessel 230 is connected to the TMS 207 via an umbilical 226. The TMS 207 is extendable and contractible by providing more or less of the tether 228 that extends between the TMS 207 and the ROV 210. The umbilical 226 and tether 228 communicate power, and data between the control interface 212, the TMS 207, and the ROV 102. In some aspects, the ROV 102 is connected with one or more system components, such as the TMS 207, via an optical fiber gigabit Ethernet backbone of a digital telemetry system (DTS). The data communicated on the umbilical 226, tether 228, and the optical fiber gigabit Ethernet backbone of the DTS includes control signals to actuators of the TMS 207 and ROV 102 and other control communications, output from sensors at the TMS 207 and ROV 102, and other data. The DTS includes a real-time computer (RTC) that is connected to the system via the optical fiber path that enables rapid spanning tree protocol redundancy.

The ROV 102, in turn, supplies power, e.g., electrical and/or hydraulic power, and exchanges data with the tools through the manipulator arms 116, enabling the operator to actuate and operate the tool via the control interface 212. The tool and ROV 102 communicate data including control signals to actuators in the tool, output from sensors in the tool, and other data, via the manipulator arm 116, which, in turn, can be communicated with the control interface 212.

The manipulator arms 116 each have a tool interchange 120 that can be operated to connect to a variety of tools carried by the tool carousel 109. There are a multitude of different tools that can be used with an ROV, including torque tools, cutters, hot stab tools, and other tools. The tool interchange 120 mounts at the end of the manipulator arm 116 and operates as an interface between the arm 116 and a selected tool. The tool interchange 120 enables the ROV 102 to change out tools while subsea with no outside assistance.

As discussed in more detail below, the operator can operate the manipulator arm 116 via the control interface 212 and the user interface 106) to engage with the tool carousel 209 to pick and exchange tools at the end of the manipulator arm 116. The tool carousel 209 may be on the ROV 102 (e.g., as illustrated in FIG. 1 as tool carousel 109), on the TMS 207 (e.g., as illustrated in FIG. 2), in both locations and/or elsewhere. In some aspects, the ROV 102 can automatically select tools from the tool carousel 209 or the operator can use the control interface 212 to select a particular tool or tool holder from a menu. The tool carousel 209 moves the tool holders to present the tool holder to facilitate the stowing and picking of one or more tools by the manipulator arm 116. In certain instances, the tool carousel 209 has tool holders that are arranged on a disk of the tool carousel 209 that rotates on its central axis to selectively align the tool holders to be presented.

The tool carousel 209 stores a plurality of subsea tools that are operable by the manipulator arms 116 of the ROV 102. The tools can include cutters such as 1½" hardline cutters, 2" soft line cutters, and 3" hard line cutters. The tools can include hub cleaning tools such as a 5½" brush, an 18¾" brush, a dredge, and a water jet. The tools can include gaskets such as a 5½" gasket and an 18¾" gasket. The tools can include grinders, water jets, paddle valve turn tools, dual port hot stabs, and pH meters. The tools can include jaws such as parallel jaws, four finger jaws, three finger jaws, and mega (11") jaws. The tools can include various hot stabs such as a dual port hot stab, hi-flow hot stab, suction hot stab, seal test hot stab, 4.5k hot stab with an isolation valve, a 15k hot stab with an intensifier and isolation valve, and a suction stab (e.g., 500 psi). The tools can include torque tools such as valve turn tools, class 1-2 torque tools and class 3-4 torque tools.

In some aspects, the tool carousel 209 stores a plurality of subsea tools and includes one or more hot stab receptacles for flushing and pressure verification for use by the manipulator arms 116. This tool storage enables rapid automated tool exchange at the touch of a button from the control interface 212 or user interface 106. The tool carousel 209 can rotate to any angular position around a full circle to present a tool to the forward center of the ROV 102 for extraction by either of the manipulator arms 116. To remove a tool, one of the manipulator arms 116 automatically latches to the tool and engages all applicable hydraulic, power, and communication connections. The manipulator arm 116 then unlocks the tool, rotates it out of the holder, and positions it in front of the ROV 102 for use by the operator.

The manipulator arms 116 are intuitively controlled at the control interface 212 by a controller (in first-person or joint mode) or master controller, or can be directly controlled by the operating system in automated sequences. Feedback for tools and the manipulator arms 116 is provided on the control console touch screens (e.g., user interface 106) and can be overlaid on a monitor wall video feed as a heads-up display (HUD) at the control interface 212 and the user interface 106.

Figure 3:
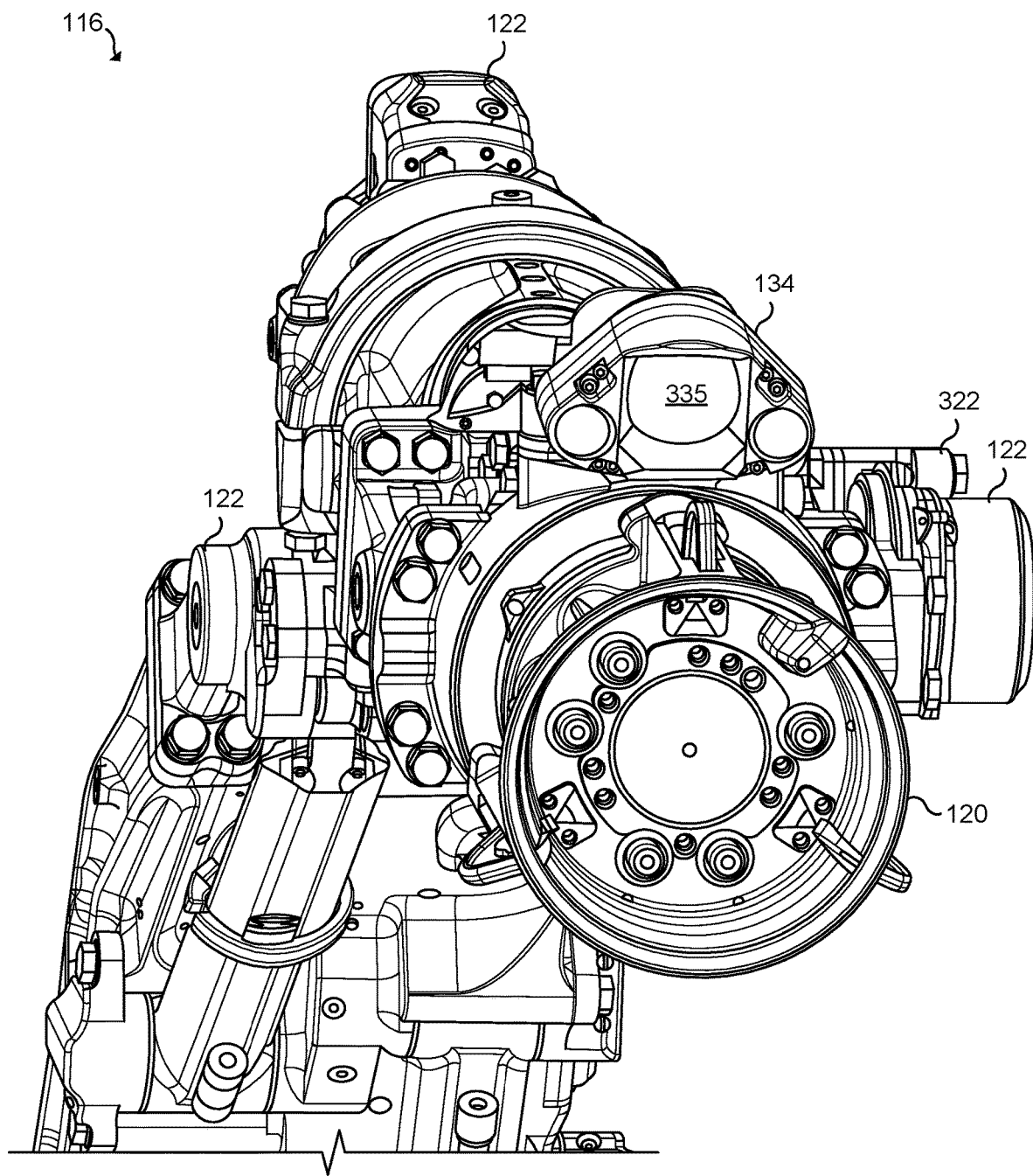
FIG. 3 shows a perspective view of an arm of the ROV of FIG. 2.

FIG. 3 illustrates an end view of one of the manipulator arms 116 of the ROV 102. The manipulator arm 116 has multiple pivot and rotational joints 122 that enable movement and control of the manipulator arm 116 in multiple degrees of freedom. The operator can control the manipulator arm 116 at the control interface 212 to maneuver the arm into a desirable orientation. In certain instances, the joints 122 in the manipulator arm 116 collectively provide 6 degrees of freedom (i.e., movement along the X-axis, Y-axis, Z-axis, roll, pitch, and yaw). Each joint 122 includes a mechanical joint that enables movement between the connected segments of the arm 116, one or more actuators to drive movement of the joint and, in certain instances, one or more sensors, such as position and force (linear and/or torque) sensors.

The manipulator arm 116 has the wrist camera 134 positioned at a wrist 322 of the manipulator arm 116. The wrist camera 134 can have a lens 335 that is directed over the tool interchange 120 to provide an imaging area that shows a portion of the tool interchange 120, and is not obstructed by the tool interchange 120. The wrist camera 134 is streamed in real time to the user interface 106, the vessel 108, and/or the server 110 to facilitate remote operations of the ROV 102. In some aspects, the wrist camera 134 is a machine vision camera that uses a combination of software and hardware to inspect and analyze objects (e.g., fiducial targets) in the wrist camera's imaging area. The ROV 102 is navigated to the subsea target 104 via control at user interface 106 and/or control interface 212, and/or by an automated sequence that is initiated and/or monitored by an operator via user interface 106 and/or control interface 212. The manipulator arms 116 articulate into a desirable position where the wrist camera 134 is directed at a subsea target (e.g., subsea target 104). The wrist camera 134 is adjusted until a fiducial marker is recognized by the wrist camera 134.

Figure 4:
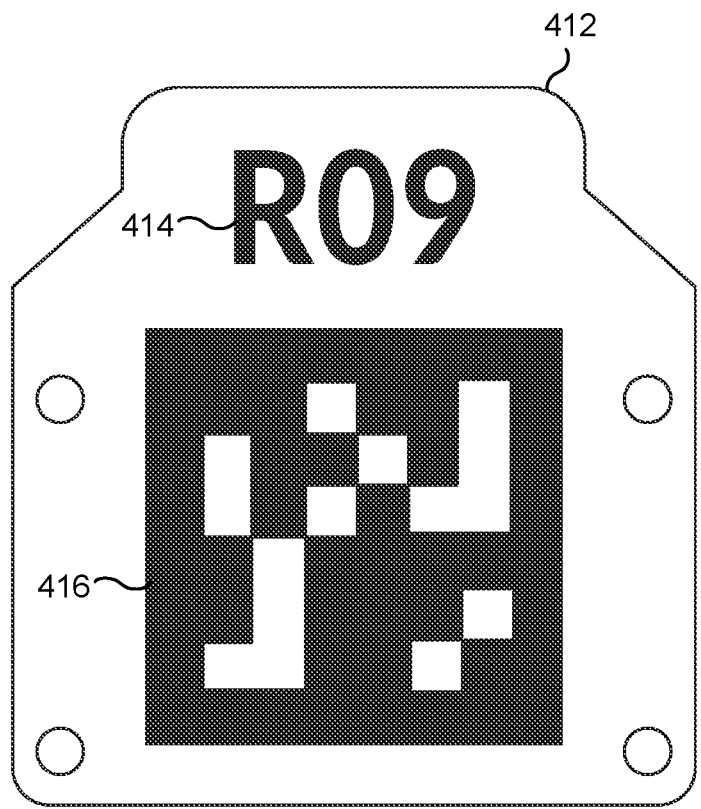
FIG. 4 shows an example fiducial marker.

Referring to FIG. 4, an example fiducial marker 412 is shown. In various example aspects, the fiducial markers described herein for use in subsea exploration and operations include one or more features of fiducial marker 412. In an example aspect, the fiducial marker 412 is a unique tag that is mounted to subsea targets to identify the subsea target and provide operational information about each target to the ROV 102. The fiducial marker 412 can be positioned at a variety of subsea targets to enable subsea operations at a multitude of subsea locations.

The fiducial marker 412 includes a machine readable marking 416 that is readable by the imaging devices of a submersible ROV. For example, the fiducial marker 412 includes a barcode, quick response "QR" code, augmented reality code (e.g., augmented reality QR code), or another type of machine readable marking.

The fiducial marker 412 includes a human readable marking 414, such as an alphanumeric code 414. The component 414 can facilitate visual identification by a human operator, and can provide an indication of a subsea asset, or facilitate retrieval of operational information, independent of analysis of the machine readable marking 416. In some aspects, the human readable marking 414 provides redundancy by providing an additional mechanism for identifying a subsea target or information related to the subsea target. In some aspects, the human readable marking 414 and the machine-readable code include some or all of the same information (e.g., in different formats). In some aspects, the human readable marking 414 includes different information than the machine readable code 416.

Alternatively or additionally, fiducial marker 412 includes one or more information stores that can be read or detected by the ROV 102. For example, the fiducial marker 412 includes an RFID tag, BLE tag, NFC tag, etc., that stores information about the subsea target 104 and that can be detected by ROV 102. In some aspects, one or more components of fiducial marker 412 facilitate detection by ROV 102 without a direct line of sight or other visual image detection of fiducial marker 412. Such a component can facilitate navigation of ROV 102 to obtain a visual line of sight (e.g., to obtain a visual line of sight to a visual component of the fiducial marker 412), and/or can facilitate information transfer without a visual line of sight.

The fiducial marker 412 provides information regarding a subsea target. For example, the fiducial marker 412 identifies that the subsea target is a tool holder, an operational interface that includes hot stab ports, a valve, or other subsea target to facilitate operations by the ROV 102 based on the information provided at the fiducial marker 412. Alternatively or additionally, the fiducial marker 412 serves as a bookmark to one or more information stores regarding the subsea target 104, where the information is stored elsewhere (e.g., in an indexed reference table) such as at the ROV 102 or the server 110. For example, the fiducial marker 412 is recognized by one or more of the imaging devices of the ROV 102, and the information regarding the subsea target is stored at the server 110 and communicated to the user interface 106 and/or the ROV 102 to facilitate operations of the ROV 102 based on the information.

Figure 5:
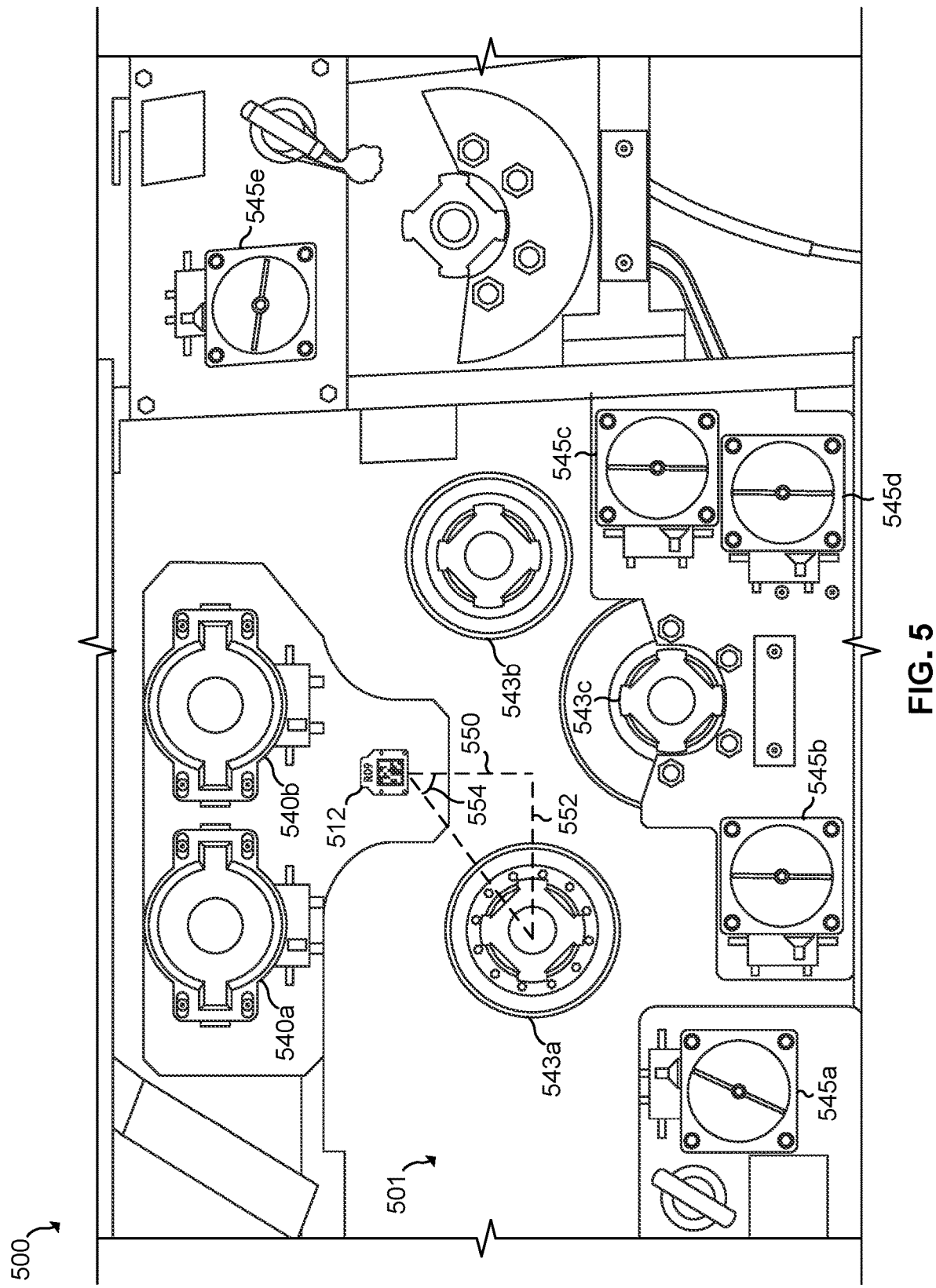
FIG. 5 shows an example interface with fiducial markers.

FIG. 5 shows an example subsea target 500 including a fiducial marker 512. In various example aspects, the subsea target 500 includes one or more features of subsea target 104 described above. The subsea target includes operable control interfaces such as hot stab ports 540a, 540b, valve controls 543a, 543b, 543c, and pressure ports 545a, 545b, 545c, 545d, 545e. The fiducial marker 512 is in a fixed predetermined position and orientation on the subsea target 500 relative to the control interfaces. The relative positioning of the operable controls of the interface 500 are thus known with respect to the fiducial marker 512. The known position of the fiducial marker 512 can be used in guiding the ROV 102 and its manipulator arm 116 to operate the operable controls and/or to confirm that the correct operable control is engaged. In certain instances, the fiducial marker 512 provides 2D or 3D position location that includes horizontal, vertical, and/or elevation distances from each of the operable controls. Alternatively or additionally, the fiducial marker provides a vector associated with an operable control, such as a distance between the fiducial marker 512 and the operable control 543a, for example, and a direction (e.g., provided by an angle 554). In this way, the ROV can precisely locate the operable control 543a relative to the fiducial marker 512 to facilitate manipulation of its arm into engagement with operable control 543a. The relative position information can also serve as confirmation that the desired operable connection is manipulated, enhancing operational reliability.

For example, the position of the valve control 543a with respect to the fiducial marker 512 is predetermined (e.g., at a time of initial manufacture or at a time of installation of the fiducial marker 512). A vertical distance 550 and a horizontal distance 552 from the fiducial marker 512 to the valve control 543a is determined (e.g., retrieved from a database/lookup table stored at the ROV 102, at the vessel 108, at the server 110, and/or another location) when the fiducial marker 512 is read by one or more of the imaging devices described above. Alternatively or additionally, an angle 554 between the fiducial marker 512 and the valve control 543a is determined when the fiducial marker 512 is read by one or more of the imaging devices described above.

In operation, the ROV 102 travels proximate to the panel 501 of the subsea target 500, and one or more of the imaging devices of the ROV are directed at the panel 501 to read the fiducial marker 512. The fiducial marker 512 (and/or a locally stored memory, server 110, etc.) in response to the fiducial marker 512 being read, provides relative location information (e.g., vector, vertical distance, horizontal distance, relative angles) for one or more of the operable controls at the interface 500. The valve control 543a is selectable by the operator, and a tool (e.g., a torque tool) at the end of the manipulator arm 116 can engage with the valve control 543a and operate the valve control 543a based on the known relative location information from the fiducial marker 512.

Identification of a position of the operable interface relative to the fiducial marker 512 can facilitate automated or semi-automated navigation and operation of the ROV with limited intervention by a human operator. Upon reading the fiducial marker 512 and determining the relative position information, the ROV can automatically navigate into a position, and move a manipulator arm 116, to engage with the identified operable interface without intervention of the operator in the navigation of the manipulator arm 116. The location information determined from the fiducial marker 512 can thus facilitate efficient engagement with an operable interface, and enhanced reliability that the desired operable interface is manipulated.

In some example aspects, relative position information of the fiducial marker 512 and one or more operable interfaces, such as operable interfaces 540, 543, and 545, is stored by the ROV. For example, relative position information associated with fiducial marker 512 and panel 501 is preloaded into memory of the ROV. Upon recognizing a fiducial marker 512, the ROV can retrieve the relative position information associated with the fiducial marker 512, such as by retrieving a distance and angle at which the operable interface 543a is located relative to the fiducial marker 512. In this way, the fiducial marker 512 can serve as a beacon or anchor location from which the relative locations of operable interfaces of the panel 501 can be mapped and navigated. In some aspects, such a configuration can facilitate streamlined operation by utilizing location information already stored locally at the ROV. The local memory of the ROV may include location information for several fiducial markers and panels 501 of different configurations, such as some or all fiducial markers and panels located in a particular subsea field or region. Alternatively or additionally, the location information is stored at a remote memory location, such as at a vessel at the surface, a remote server, etc., and communicated to the ROV (e.g., in real time) to facilitate operation by the ROV.

In an example aspect, the panel 501 includes a single fiducial marker 512 and relative position information of multiple operable interfaces are mapped based on the single fiducial marker 512. Alternatively or additionally, the panel 501 includes multiple fiducial markers 512. The relative position of one or more operable interfaces are mapped to a first fiducial marker, and the relative position of one or more different operable interfaces are mapped to a second fiducial marker. In some aspects, each operable interface is associated with a single fiducial marker, and/or every operable interface is associated with its own unique fiducial marker.

Figure 6:
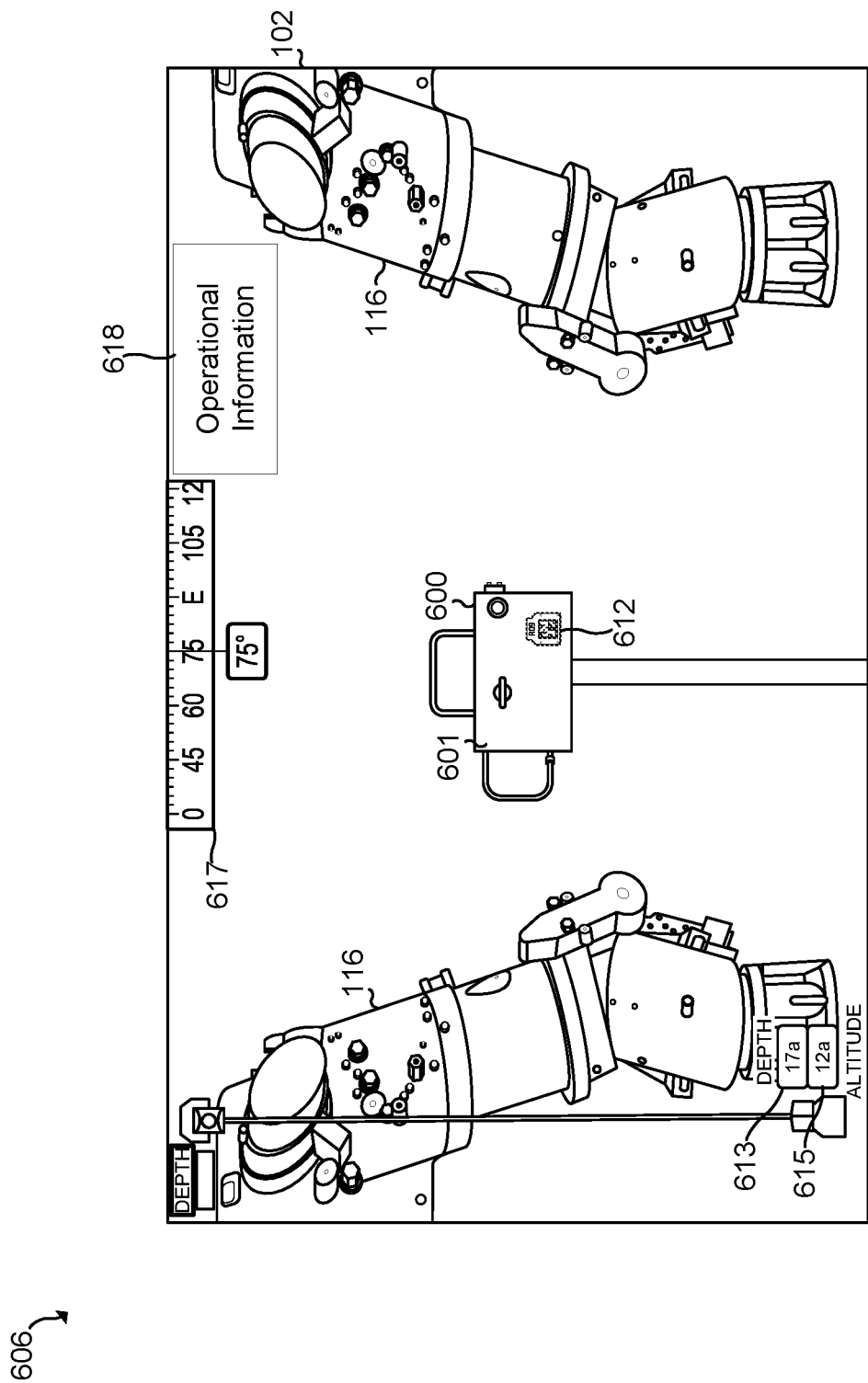
FIG. 6 shows an example view of a user interface.

FIG. 6 shows an example user interface 606 including a subsea target 600 having a fiducial marker 612 in view. In various example aspects, the subsea target 600 and user interface 606 include one or more features of subsea target 104 and subsea target 500, and of user interface 106, for example, described above. In some aspects, the view shown on the user interface 606 is received from a video output of a front facing camera on the ROV 102, such as front facing camera 130. The user interface 606 is presented to the operator or manager of the ROV 102, and is utilized for monitor, control, and/or management of the operations of the ROV 102. In some aspects, the operator or manager can observe the automated operations of the ROV 102 from the various imaging devices, including as shown in FIG. 6. Alternatively or additionally, the automated operations of the ROV 102 can be interrupted or controlled by the operator.

The ROV 102 is navigated to the panel 601 of the subsea target 600, and one or more of the imaging devices (e.g., front facing camera 130) of the ROV are directed at the panel 601 so that the fiducial marker 612 is read. The fiducial marker 612 (and/or a locally stored memory, server 110, etc.) in response to the fiducial marker 612 being read, provides information regarding the subsea target 600, the information including interface information such as the types of control interfaces present on the panel 601, the relative location information (e.g., vector, vertical distance, horizontal distance, relative angles) for one or more of the operable interfaces at the panel 601, operational parameters for one or more of the operable interfaces at the panel 601, historical operational parameters for one or more of the operable interfaces at the panel 601, among other relevant information regarding the subsea target 600.

The user interface 606 illustrates a real-time video stream of the operations of the ROV 102. For example, the user interface 606 displays the view from the front facing camera 130 while the ROV 102 is navigating to the subsea target 600. The view from the front facing camera 130 includes at least portions of the manipulator arms 116, and/or shows the orientation, movement, and operations of the manipulator arms 116 in the real-time video. The real-time video shown at the user interface 606 displays information at various times throughout the real-time video, and the displayed information is relevant information based on the operations of the ROV 102 at the time the information is displayed. For example, the user interface 606 displays ROV 102 navigation information including a depth 613, an altitude 615, and orientation angles 617 that facilitate navigation of the ROV 102 subsea by tracking and displaying the location of the ROV 102 in real time. The navigation information is tracked and updated in real time as the ROV 102 moves, and the precise tracking and display of the navigation information facilitates improved navigation and control of the ROV 102.

The user interface 606 displays information regarding the subsea target 600 when the fiducial marker 612 is read. For example, the user interface 606 displays information regarding what the subsea target 600 is, the location of the subsea target 600, information regarding one or more operable interfaces at the subsea target 600, the relative position information of the fiducial marker 612 and the one or more operable interfaces. For example, the fiducial marker 612 provides information regarding a valve at the subsea target 600. The user interface 606 displays information 618 about the valve such as the valve name, the valve type, the number of turns of the valve, the operating torque of the valve, and the damage torque of the valve. In another example, concurrently and/or independently, the fiducial marker 612 provides information 618 regarding a hot stab port. The user interface 606 displays information about the hot stab port including the hot stab port name, the type of the hot stab port, the volume, the operating pressure, the maximum pressure, and the damage pressure. The user interface 606 displays the information as a prompt on the user interface 606 and/or overlays the information on the user interface 606. In various example aspects, the user interface 606 includes an association between the fiducial marker 612 and the information or prompt. For example, the user interface augments the video feed to highlight the fiducial marker 612, such as with a colored box or other indicator surrounding or overlaying the fiducial marker 612. Alternatively or additionally, the prompt includes an indicator or complementary designation the visually indicates association between fiducial marker 612 and the information provided by the prompt.

Figure 7:
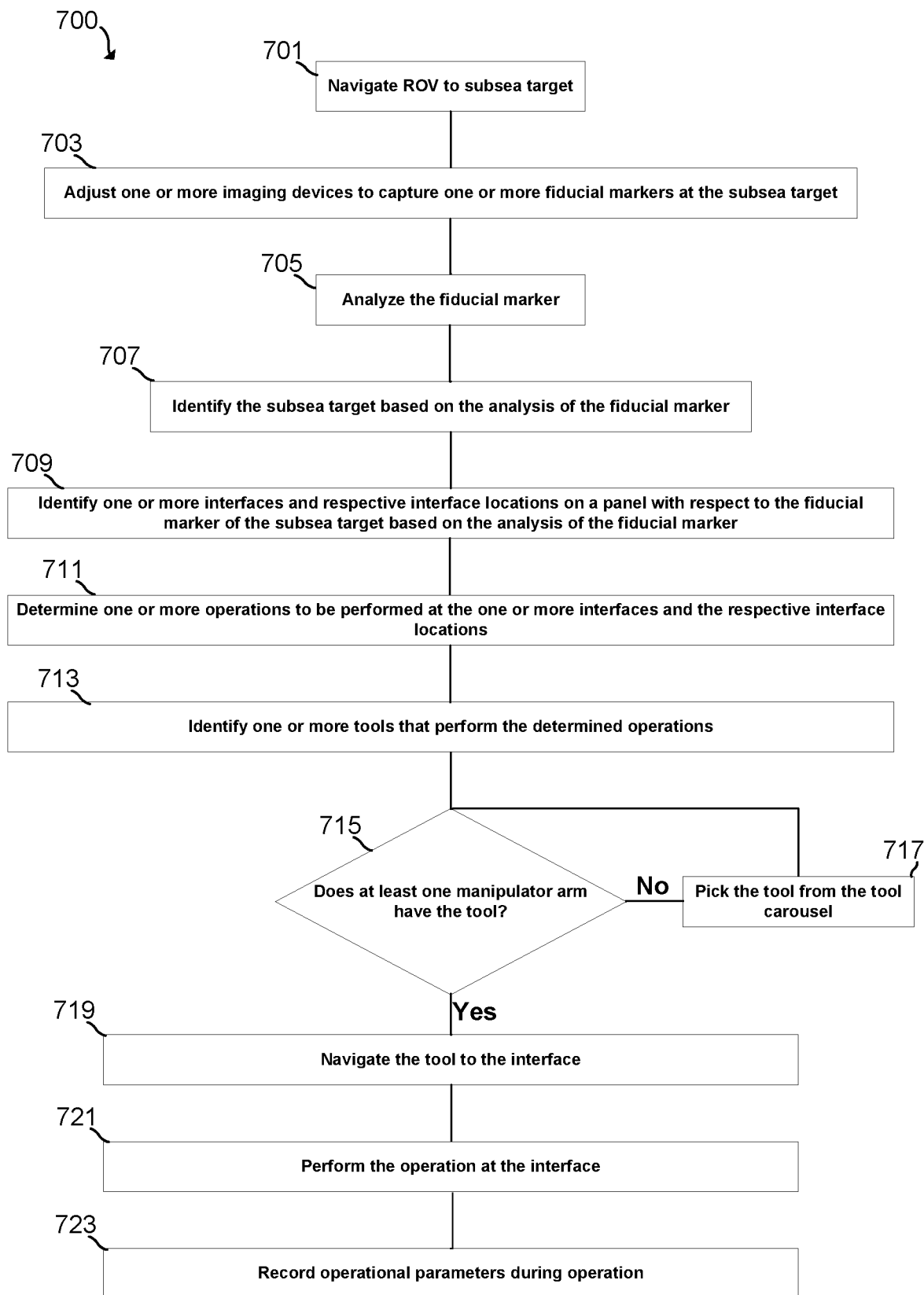
FIG. 7 shows an example process for subsea installation and production.

FIG. 7 illustrates an example automated subsea process 700 for subsea installation and production. The process 700 is utilized for monitoring, controlling, and/or managing operations of the ROV 102. In some aspects, the operator or manager can observe the automated operations of the process 700 at a user interface such as user interface 106, 606. In other aspects, the automated operations of the process 700 can be interrupted or controlled by the operator. In various example aspects, process 700 includes one, some, or all of the following operations.

The process 700 includes operation 701 of navigating the ROV 102 to a subsea target. In some aspects, navigation of the ROV 102 is automated and the subsea target location is provided to the ROV 102 so that the ROV 102 can navigate to the subsea target. In some aspects, the navigation of the ROV 102 can occur with the supervision and occasional intervention of the operator. The step 701 can include navigation from a vessel to a subsea target or from one subsea target to another subsea target.

The process 700 includes operation 703 of adjusting one or more imaging devices to capture one or more fiducial markers at the subsea target. Adjustment of the one or more imaging devices includes movement of the ROV 102, movement of the manipulator arms 116, movement of the imaging devices (e.g., tilting, rotating, extending), focusing of the imaging devices, and/or adjustment of the lighting (e.g., turning lights on, turning lights off, changing from a color view to a black and white view, etc.) to facilitate an improved view of the one or more imaging devices. The adjustment of the imaging devices can automatically continue until one or more fiducial markers are recognized and captured.

The process 700 includes operation 705 of analyzing the fiducial marker. The fiducial marker serves as a bookmark to the information regarding the subsea target, and the information is stored remote from the fiducial marker. The fiducial marker provides the location of the information or information that can be used to determine the location of relevant information, such as an identifier of the subsea target. The identified location is in a database stored at the ROV 102, the vessel 108, the server 110, etc., for example. The fiducial marker is recognized by the machine vision camera and provides an address, bookmark, pointer, identifier of the subsea target, etc., to information stored in the memory of the machine vision camera at the ROV 102. Alternatively or additionally, the information regarding the subsea target is stored in memory elsewhere on the ROV 102, at the vessel 108, at the server 110, and/or at another location remote from the ROV 102. The information is communicated to the user interface 106 and/or the ROV 102 (e.g., in real time) to facilitate operations of the ROV 102 based on the information.

The process 700 includes operation 707 of identifying the subsea target based on the analysis of the fiducial marker. For example, the fiducial marker 112 facilitates a determination that the subsea target 104 is a tool holder, a subsea tree, riser, umbilical, BOP, wellhead, manifold, jumper, flowline, etc., and/or an operational interface that includes hot stab ports, valves, etc. associated with the subsea target 104. In some aspects, the fiducial marker serves as an asset identifier that identifies the subsea target, such as a name, type, unique identifier, etc., of the subsea target, and a data sheet associated with the subsea target and/or an interface of the subsea target. The data sheet can be retrieved by the ROV 102, operator, etc. from any number of databases where the data sheet is stored. Determination of the subsea target 104 via the fiducial marker 112 facilitates efficient and accurate identification of the subsea target 104 and its interfaces, promoting operational effectiveness and reliability in carrying out operations by the ROV 102.

The process 700 includes operation 709 of identifying one or more interfaces and respective interface locations on a panel with respect to the fiducial marker of the subsea marker based on the analysis of the fiducial marker. The fiducial marker provides information regarding the subsea target. For example, the fiducial marker is encoded to identify the subsea target 104, its interface(s), and/or operational information. The fiducial marker (and/or a locally stored memory, server 110, etc.) in response to the fiducial marker being read, provides relative location information (e.g., vector, vertical distance, horizontal distance, relative angles) for one or more of the operable controls at the interface.

In some example aspects, relative position information of the fiducial marker and one or more operable interfaces is stored by the ROV. For example, relative position information is preloaded into memory of the ROV. Upon recognizing a fiducial marker, the ROV can retrieve the relative position information associated with the fiducial marker, such as by retrieving a distance and angle at which the operable interfaces are located relative to the fiducial marker. The fiducial marker 512 can serve as an anchor location from which the relative locations of operable interfaces of the subsea target are mapped and navigated.

The process 700 includes operation 711 of determining one or more operations to be performed at the interface locations. Each of the one or more operable interfaces are operable by the ROV 102, and the operations can be automatically predetermined before the subsea target is navigated to, or can be selected when the subsea target is encountered. Operation 711 provides a determination of an operation or a list of operations that could be performed at the subsea target based on the one or more operable interfaces present at the subsea target.

The process 700 includes operation 713 of identifying one or more tools that perform the determined operation or list of operations. For example, at operation 711 one of the operations includes determining that a valve control operation should be performed in which a valve is turned to adjust the valve position (e.g., adjust a pressure, operate between open and closed configurations, etc.). The operation 713 determines that a torque tool performs the valve control operation.

The process 700 includes operation 715 of determining if at least one manipulator arm has the determined tool. For example, the operation 715 determines if one of the manipulator arms has a torque tool compatible with the valve control. If the manipulator arms do not have the determined tool, at operation 717 the process 700 continues by picking the determined tool (e.g., from the tool carousel).

At operation 719, if at least one manipulator arm has the determined tool, the tool is navigated to the interface. Identification of a position of the operable interface relative to the fiducial marker facilitates automated or semi-automated navigation and operation of the ROV with limited intervention by a human operator. The ROV automatically navigates into a position, and moves a manipulator arm to engage with the identified operable interface without intervention of the operator in the navigation of the manipulator arm. At operation 721, the operation is performed at the interface by the manipulator arm and the tool. At operation 723 (which can occur concurrently with operation 721), operational parameters are recorded during the operation. For example, if the torque tool applies a sensed number of turns, a sensed amount of torque, the operation 723 tracks and records the operational parameters as they occur.

Figure 8:
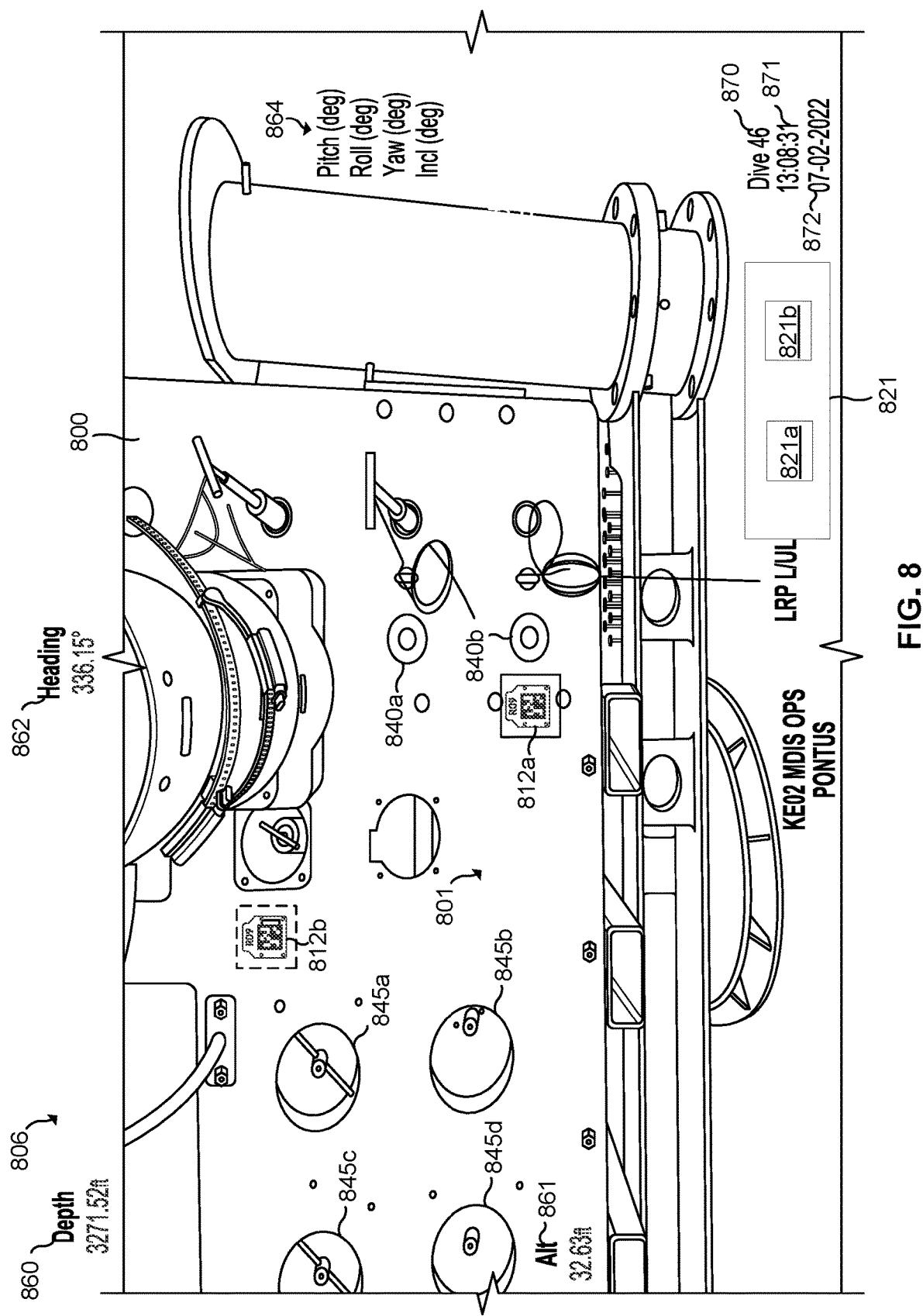
FIG. 8 shows another example interface including fiducial markers.

FIG. 8 shows another example subsea target 800 in view on a user interface 806, the subsea target 800 has fiducial markers 812a, 812b positioned on a panel 801 of the subsea target 800. In various example aspects, the subsea target 800 includes one or more features of subsea target 104 and the subsea target 500 described above. The subsea target includes operable control interfaces such as hot stab ports 840a, 840b and pressure ports 845a, 845b, 845c, 845d. The fiducial markers 812a, 812b are each in a fixed predetermined position and orientation on the subsea target 800 relative to the control interfaces. The relative positioning of the operable controls of the subsea target 800 are thus known with respect to at least one of the fiducial markers 812a, 812b. The known position of the fiducial markers 812a, 812b can be used in guiding the ROV 102 and its manipulator arm 116 to operate the operable controls. In certain instances, the fiducial markers 812a, 812b provide 2D position location that includes horizontal and vertical distances from each of the operable controls.

As shown in FIG. 8, the panel 801 includes multiple fiducials 812a, 812b. Each of the fiducials 812a, 812b are readable by one or more of the imaging devices described herein, and each fiducial 812a, 812b can be targeted by the imaging devices. Each fiducial 812a, 812b can store different information regarding the subsea target 800 and can be independently targeted and selected for different operations. For example, the fiducial 812a is the targeted fiducial for a particular operation. The fiducial 812a is highlighted or otherwise designated on the user interface 806a and information associated with the fiducial 812a is presented on the user interface 806. For example, the video on the user interface 806 is augmented with a green box (arrow, line, etc.) at the targeted fiducial 812a, while one or more other fiducials (e.g., fiducial 812b) are augmented with a red box or not augmented with any highlighting. In some aspects, augmenting multiple fiducials with different indicators can be used to confirm that the fiducials have been detected, and to indicate which fiducial is selected. For example, the presence of an indicator can be used to indicate that the fiducial has been detected (e.g., and read). The green box (solid line) around fiducial 812a indicates that fiducial 812a has been detected and read, and that fiducial 812a is targeted. For example, augmented information overlaying the video feed is associated with targeted fiducial 812a. The view of user interface 806 includes augmented information 821 overlaying the video feed. Augmented information 821 includes an interface identifier 821a associated with the targeted fiducial and operational information 821*b* related to the interface. In some aspects, the augmented information includes an indicator that visually associates the information with the targeted fiducial 812. For example, the targeted fiducial 812*a* is surrounded by a colored box (e.g., green), and the augmented information 821 is surrounded by a same colored box, some or all text is displayed in a same color as the targeted fiducial 812 (e.g., green). Such visual associations can quickly indicate to a viewer which interface/fiducial the augmented information is associated with.

Alternatively or additionally, the targeted fiducial (e.g., fiducial 812*a*) can be selected, by an operator or automatically via an automated protocol, for operations associated with the information of the targeted fiducial. The red box (broken line) around fiducial 812*b* indicates that fiducial 812*b* has been detected and read, and that fiducial 812*b* is not targeted. For example, the augmented information overlaying the video feed is not associated with fiducial 812*b*, and the fiducial 812*b* is available to be targeted (e.g., by a human operator selecting fiducial 812 via the user interface 806). Alternatively or additionally, the user interface includes augmented information associated with the non-targeted fiducial 812*b*. The augmented information includes an indicator that visually associates the information with the non-targeted fiducial 812*b*. For example, the non-targeted fiducial is surrounded by a colored box (e.g., red), and the augmented information is surrounded by a same colored box, some or all text is display in a same color as the targeted fiducial 812 (e.g., red). Distinct visual associations can facilitate simultaneous display of augmented information associated with different fiducials 812*a*, 812*b*.

The video feed at the user interface 806 can be augmented with a variety of information as a heads-up display to facilitate monitoring and/or operation of the ROV 102. For example, the information includes information associated with the location/position of the ROV 102, such as a depth 860, an altitude 861, a heading 862, pitch, roll, yaw, and incline information 864, that continuously update in real time on the displayed video feed at the user interface 806. The video feed at the user interface 806 is also augmented with an operation number 870, a time 871, and a date 872 that are continuously updated in real time on the displayed video feed.

Automated operations are performed at the subsea target 800 in a similar manner to the automated operations described above. The automated operations include navigating manipulator arms 116 and tools 118 to engage with the operable controls at the panel 801. While operations are performed, the automated processes and operations identify, maintain, and/or extract interface and operational historical data. For example, the system can log operational information associated with the subsea target 800 contemporaneously with engagement of the operable controls of the subsea target 800. The contemporaneous logging of operational information can be achieved using a plurality of sensors and tools (e.g., tools 118) that engage with the operable controls of the subsea target(s) (e.g., subsea target 800). The operational parameters are stored on memory at the ROV 102, at the vessel 108, at the server 110, and/or another location (e.g., for later upload to a database located at vessel 108, server 110, another location, etc.), or transmitted (e.g., in real) to a remote location such as vessel 108, server 110, etc.

The fiducial markers 812*a*, 812*b* facilitate determination of operational information associated with the subsea target 800 that the fiducial markers 812*a*, 812*b* are affixed to. In an example aspect, the operational information includes an operating parameter associated with one of the control interfaces at the subsea target 800, such as a rated torque value for operating the interface, a rated number of turns for operating the interface, pressure, volume, force, voltage, current, pH readings, optical properties, etc. Operational information is obtained during operations by one or more sensors on board the ROV 102, tools 118, and/or the manipulator arms 116. For example, the ROV 102, tools 118, and/or the manipulator arms 116 include imaging devices, accelerometers, pH meters, gyroscopes, pressure sensors, torque sensors, flow rate sensors, among others. Each of the sensors of the ROV 102, tools 118, and/or the manipulator arms 116 collect, track, and log signals obtained during operations at the control interfaces. The signals collected from the sensors are collected, indexed, logged, and maintained as historical operational information for the control interfaces and subsea targets.

In some aspects, the operational information includes specified or expected values. Alternatively or additionally, the operational information includes historical values measured during a previous operation, or historical averages obtained based on previous measured values, associated with the subsea target 800 or the particular interface of the subsea target 800. For example, when the torque tool applies a sensed number of turns or a sensed amount of torque, the system tracks and records the operational parameters (e.g., as the operational parameters occur/contemporaneously with the operation). The operational information includes a historic torque value required to operate the interface during a previous operation, which in some scenarios may more accurately reflect an expected torque value required to operate the interface because the torque value may deviate from an original specified value due to wear over the life of the interface, or due to environmental or operational characteristics. Each operational parameter that is tracked, logged, and displayed can include one or more of an interface or target, time of the operation, a type of operation, and an operating parameter. The operational parameters are indexed together to include one or more of the interface or the target, time of the operation, the type of operation, and the operating parameter.

In some aspects, the operating information includes submersible ROV parameters, including position, orientation, and tool configuration. The position information includes where the ROV 102 was at the time the parameter was logged, such as a depth, an altitude, a heading, or combinations thereof, to facilitate trackable and traceable position information when the operational parameters were logged. The orientation information includes the pitch, roll, yaw, and incline information to facilitate an accurate representation of the orientation of the ROV 102 102 when the operational parameters were logged. The tool configuration information includes the type of tool that was used to perform the operation, the size of the tool that was used, and which of the manipulator arms the tool was connected to. The operating information includes environmental parameters at the operation location, including depth, temperature, and/or pressure.

The operational information also includes identification of an interface of the item of subsea equipment engaged by the submersible ROV 102 during an operation. For example, the operational information includes an identification of interfaces such as one or more hot stab ports, valve controls, pressure ports, etc. The operational information is logged by each specific interface so that interface specific operational information is stored and logged. For example, a subsea target can include multiple interfaces such as multiple hot stab ports, multiple valve controls, and multiple pressure ports. Each of the hot stab ports, valve controls, and pressure ports that are operated are tracked and the operational information is automatically logged and segmented by each interface.

The operational information is associated with the item of equipment in the database (e.g., the database located at the ROV 102, at vessel 108, server 110, another location, etc.), based on the fiducial data obtained from one or more fiducial markers (e.g., fiducial markers 812a, 812b) at the subsea target 800. The operational information is retrievable from the database based on an identifier, such as at least one of the fiducial markers 812a, 812b of the item of equipment. As discussed above, the fiducial markers 812a, 812b are in fixed predetermined positions and orientations on the subsea target 800 relative to the control interfaces. Operations that have been performed at the control interfaces are logged in real-time during the operations to capture operational parameters that are logged to the database based on the specific control interfaces at the subsea target 800. The operable parameters that have been measured at the operable controls of the interface 800 are thus known and logged as historical operable parameters that are specific to the subsea target 800, and the historical operable parameters for the subsea target 800 are accessible via the one or more fiducial markers 812a, 812b.

Retrieval of historical operational information can be facilitated by reading the fiducial markers 812a, 812b. The known operational information for the control interfaces is accessed when the fiducial markers 812a, 812b are read (e.g., automatically or via one or more subsequent operations based on information obtained from reading the fiducial marker), and the fiducial markers 812a, 812b operate as a bookmark to the operational information for the specific subsea target 800 that the fiducial markers 812a, 812b are attached to. In response to the reading of the fiducial markers 812a, 812b, the historical operational information for the subsea target 800 that is stored in the database (e.g., the database located at the ROV 102, the vessel 108, server 110, etc.) is communicated to the user interface 806 for display and the ROV 102 for operation.

The historical operational information can be used to inform the ROV 102 about previous operations at the operable control interfaces. For example, the hot stab port 840a has been operated previously and has had a low pressure the last five times the hot stab port 840a was operated. The previous operations at the hot stab port 840a are logged at the databased and associated with the subsea target 800 via at least one of the fiducial markers 812a, 812b. The ROV 102 is navigated to the subsea target 800, and at least one of the fiducial markers 812a, 812b are read by the imaging devices of the ROV 102. One or more operations are determined based on the control interfaces mapped on the subsea target 800 in relation to the fiducial markers 812a, 812b. In addition to mapping the relative positions of each of the control interfaces at the subsea target 800, reading the fiducial markers 812a, 812b prompts communication of the historical operational information for the subsea target 800 that is stored in the database to the user interface 806 and the ROV 102. As such, the previous operations at the hot stab port 840a are presented to an operator and the ROV 102 that the hot stab port 840 has previously had low pressure readings. In some aspects, the pressure readings are provided at the user interface 806 to inform an operator of an expected pressure range based on historical pressure results for the hot stab port 840a at the subsea target 800. The historical operational information accessed from the database via the fiducial markers 812a, 812b can thus facilitate efficient engagement with an operable interface, and enhanced operations by providing expected operational results based on historical data that is specific to each subsea target (e.g., subsea target 800) and each control interface (e.g., hot stab port 840a).

The historical operational parameters can facilitate improved operations at the identified interface(s) by providing information to the system regarding the parameters that have been previously encountered at the identified interface(s). The historical operational parameters can be provided in real time during operations to facilitate improved operational efficiency by providing the historical parameters. In some aspects, the historical operational parameters can reduce trial-and-error and/or uncertainty regarding expected operational parameters (e.g., an expected torque required to operate an interface).

The historical operational parameters facilitate enhanced asset monitoring and maintenance. In some aspects, historical operational parameters readily accessible based on a particular asset, interface, etc., facilitate implementation of maintenance protocols. For example, automated maintenance protocols can be implemented to efficiently, effectively, and predictably initiate and/or perform maintenance operations based on the historical operational information that is known for one or more subsea targets. The maintenance protocols are automatically executable by the ROV 102 that has on board or remotely in communication with the ROV 102 at least one processor and a memory with instructions stored on the memory operable to cause the system to prompt a user to initiate a maintenance operation. The maintenance protocols initiate a prompt based on historical operational information logged to the database during one or more prior operations, such as a measured parameter that deviates from an expected or specified parameter by a threshold value, a number of operations performed on an asset, an age of the asset, combinations thereof, etc. The user can initiate the operation at the user interface (e.g., user interface 806), carry out the recommended maintenance operation, or perform further inspection and/or monitoring in accordance with the recommended maintenance.

Figure 9:
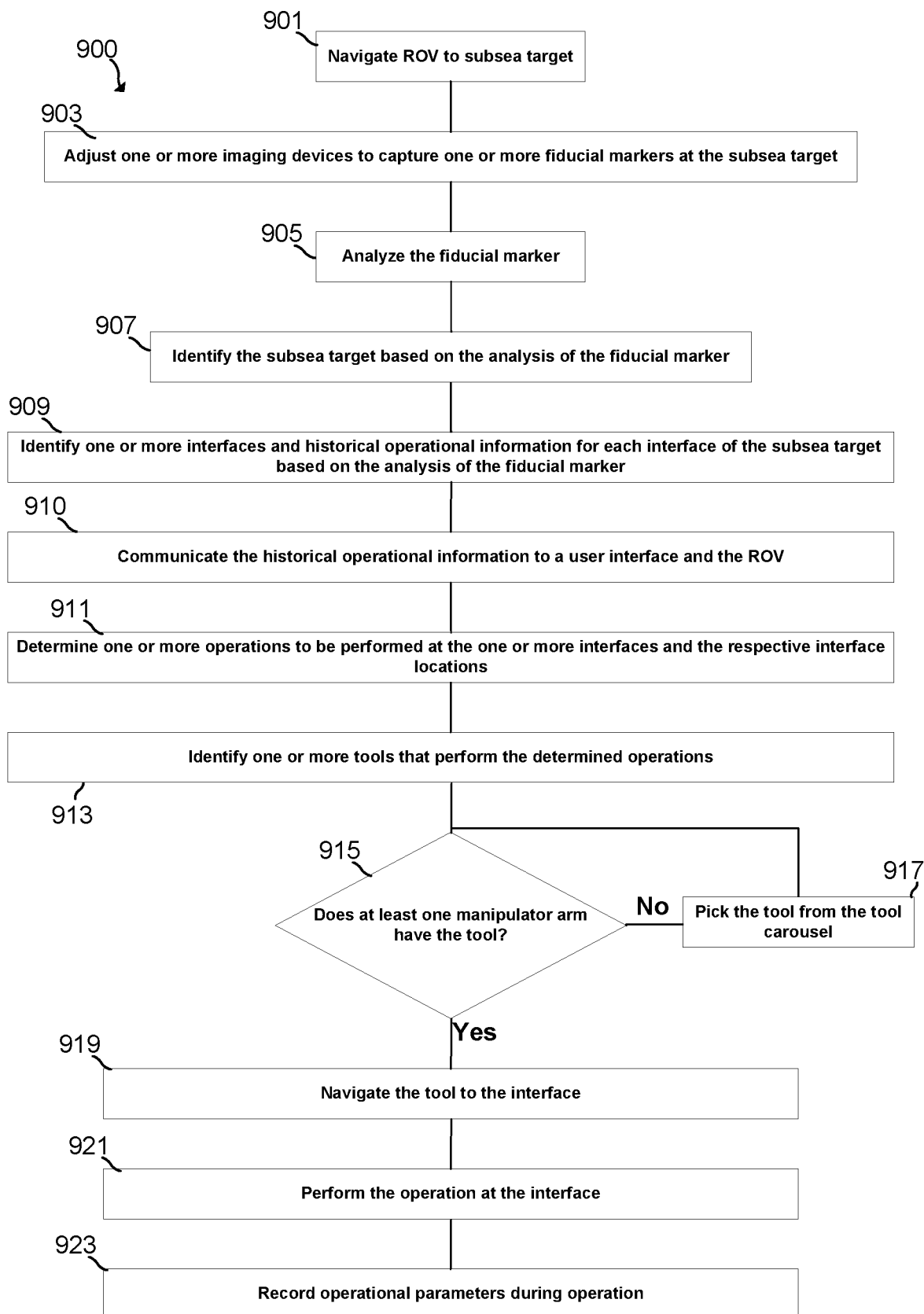
FIG. 9 shows an example process for subsea maintenance and production.

FIG. 9 illustrates an example automated subsea process 900 for subsea maintenance and production. The process 900 is utilized for monitoring, controlling, and/or managing of the operations of the ROV 102. In some aspects, the operator or manager can observe the automated operations of the process 900 at a user interface such as user interface 106, 606, 806. In other aspects, the automated operations of the process 900 can be interrupted or controlled by the operator.

The process 900 includes operation 901 of navigating the ROV 102 to a subsea target. In some aspects, navigation of the ROV 902 is automated and the subsea target location is provided to the ROV 102 so that the ROV 102 can navigate to the subsea target. In some aspects, the navigation of the ROV 102 can occur with the supervision and/or intervention of the operator. The operation 901 can include navigation from a vessel to a subsea target or from one subsea target to another subsea target.

The process 900 includes operation 903 of adjusting one or more imaging devices to capture one or more fiducial markers at the subsea target. Adjustment of the one or more imaging devices includes movement of the ROV 102, movement of the manipulator arms 116, movement of the imaging devices (e.g., tilting, rotating, extending), focusing of the imaging devices, and/or adjustment of the lighting (e.g., turning lights on, turning lights off, changing from a color view to a black and white view, etc.) to facilitate an improved view of the one or more imaging devices. The adjustment of the imaging devices can automatically continue until one or more fiducial markers are recognized and captured.

The process 900 includes operation 905 of analyzing the fiducial marker. The fiducial marker serves as a bookmark to the information regarding the subsea target including relative positional information and maps of the subsea interface to one or more control interfaces at the subsea target and associated historical operational information for each of the control interfaces at the subsea target. The information regarding the subsea target is stored remote from the fiducial marker and the ROV 102 and can be communicated to a user interface and the ROV 102 during the process 900. The fiducial marker provides the location of the information (e.g., in a database stored at the ROV 102, the vessel 108, the server 110, etc.). The fiducial marker is recognized by the machine vision camera and provides an address, bookmark, pointer, etc., to information stored in the memory of the machine vision camera. Alternatively or additionally, the information regarding the subsea target is stored in memory elsewhere on the ROV 102, at the vessel 108, at the server 110, and/or at another location remote from the ROV 102. The information is communicated to the user interface 806 and/or the ROV 102 (e.g., in real time) to facilitate operations of the ROV 102 based on the information.

The process 900 includes operation 907 of identifying the subsea target based on the analysis of the fiducial marker. For example, the fiducial marker 812a facilitates a determination that the subsea target 800 is a tool holder, a subsea tree, riser, umbilical, BOP, wellhead, manifold, jumper, flowline, etc., and/or an operational interface that includes hot stab ports, valves, etc. associated with the subsea target 800. In some aspects, the fiducial marker serves as an asset identifier that identifies the subsea target, such as a name, type, unique identifier, etc., of the subsea target, and a data sheet associated with the subsea target and/or an interface of the subsea target. The data sheet can be retrieved by the ROV 102, operator, etc. from any number of databases where the data sheet is stored. Determination of the subsea target 800 via the fiducial marker 812a, 812b facilitates efficient and accurate identification of the subsea target 104 and its interfaces, promoting operational effectiveness and reliability in carrying out operations by the ROV 102.

The process 900 includes operation 909 of identifying one or more interfaces and historical operational information for each interface of the subsea target based on the analysis of the fiducial marker. The fiducial marker provides historical operational information regarding the subsea target. For example, the fiducial marker is encoded to identify the subsea target 800, its interface(s), and historical operational information for each interface. The fiducial marker (and/or a locally stored memory, server 110, etc.) in response to the fiducial marker being read, provides relative location information (e.g., vector, vertical distance, horizontal distance, relative angles) for one or more of the operable controls at the interface and historical operational information for each of the operable controls at the interface.

The historical operational information includes various operational parameters as described above such as a rated torque value for operating the interface, a rated number of turns for operating the interface, pressure, volume, force, voltage, current, pH readings, optical properties, etc. for each operational interface at the identified subsea target. The operational information includes historical values measured during a previous operation, or historical averages obtained based on previous measured values, associated with the subsea target or the particular interface of the subsea target.

In some example aspects, relative position information of the fiducial marker and one or more operable interfaces and the historical operational information for the operable controls are stored by the ROV. For example, historical operational information for a maintenance operation is preloaded into memory of the ROV. Upon recognizing a fiducial marker, the ROV can retrieve the historical operational information associated with the fiducial marker, such as by retrieving a number of turns that were previously applied to a pressure valve.

The process 900 includes operation 910 of communicating the historical operational parameters to a user interface and the ROV. The historical operational parameters are overlaid onto the live video feed during the process 900 at the user interface (e.g., user interface 806) to illustrate the historical operational parameters that have been recorded for each control interface. The historical operational parameters can reduce trial-and-error and/or uncertainty regarding expected operational parameters (e.g., an expected torque required to operate an interface).

The process 900 includes operation 911 of determining one or more operations to be performed at the interface locations. Each of the one or more operable interfaces are operable by the ROV 102, and the operations can be automatically predetermined before the subsea target is navigated to, or can be selectable when the subsea target is encountered. Additionally or alternatively, the operations can be updated in real time based on historical operational information for the subsea target 800. For example, if the subsea target 800 has historical operational information that indicates a pressure reading that has been lower than expected in previous operations, the operation 911 can add an operation to check the pressure reading if a check pressure operation was not previously added to a maintenance protocol. Operation 911 provides a determination of an operation or a list of operations that could be performed at the subsea target based on the one or more operable interfaces and historical operational information for the one or more operable interfaces present at the subsea target.

The process 900 includes operation 913 of identifying one or more tools that perform the determined operation or list of operations. For example, at operation 911 one of the operations includes determining that a valve control operation should be performed where a valve is turned to adjust the valve pressure. The operation 913 determines that a torque tool performs the valve control operation.

The process 900 includes operation 915 of a determination if at least one manipulator arm has the determined tool. Continuing the example above, the operation 915 determines if one of the manipulator arms has a torque tool compatible with the valve control. If the manipulator arms do not have the determined tool, at operation 917 the process 900 continues by picking the determined tool (e.g., from the tool carousel).

At operation 919, if at least one manipulator arm has the determined tool, the tool is navigated to the interface. Identification of a position of the operable interface relative to the fiducial marker facilitates automated or semi-automated navigation and operation of the ROV with limited intervention by a human operator. The ROV automatically navigates into a position, and moves a manipulator arm to engage with the identified operable interface without intervention of the operator in the navigation of the manipulator arm. The historical operational information is leveraged before the operation is performed to determine expected results, and is provided to the ROV 102 and the operator before and during the operation.

At operation 921, the operation is performed at the interface by the manipulator arm and the tool. At operation 923 (which can occur concurrently with operation 921), operational parameters are recorded during the operation and added to the historical operational information for each of the interfaces that are operated. Operational information is obtained during operations by one or more sensors on board the ROV 102, tools 118, and/or the manipulator arms 116. For example, the ROV 102, tools 118, and/or the manipulator arms 116 include imaging devices, accelerometers, pH meters, gyroscopes, pressure sensors, torque sensors, flow rate sensors, among others. Each of the sensors of the ROV 102, tools 118, and/or the manipulator arms 116 collect, track, and log signals obtained during operations at the control interfaces. The signals collected from the sensors are collected, indexed, logged, and maintained as historical operational information for the control interfaces and subsea targets. In an example, if the torque tool applies a sensed number of turns, a sensed amount of torque, the operation 923 tracks and records the operational parameters as they occur and adds the tracked values to the historical operational information for the operable control. Likewise, sensor data from one or more of the imaging devices, accelerometers, pH meters, gyroscopes, pressure sensors, torque sensors, flow rate sensors are tracked and recorded. At operation 923, operational information is logged and associated with the subsea target contemporaneously with engagement of the operable controls of the subsea target. The contemporaneous logging of operational information can be achieved using the plurality of sensors and tools (e.g., tools 118) that engage with the operable controls of the subsea target(s) (e.g., subsea target 800). The operational parameters are stored on memory at the ROV 102, at the vessel 108, at the server 110, and/or another location, (e.g., for later upload to a database located at vessel 108, server 110, etc.), or transmitted (e.g., in real time) to a remote location such as vessel 108, server 110, etc.

Figure 10:
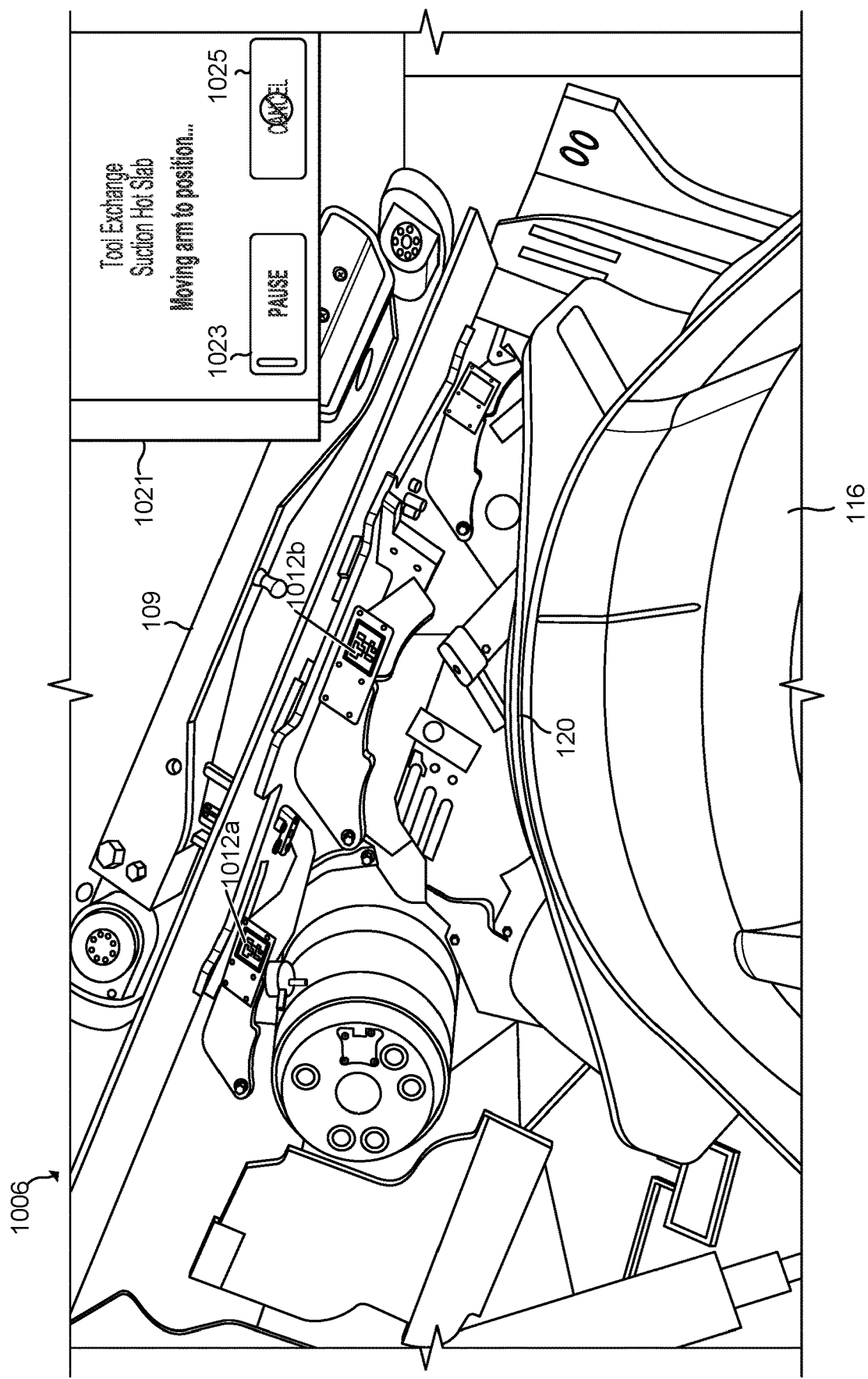
FIG. 10 shows another example view of a user interface.
Figure 11:
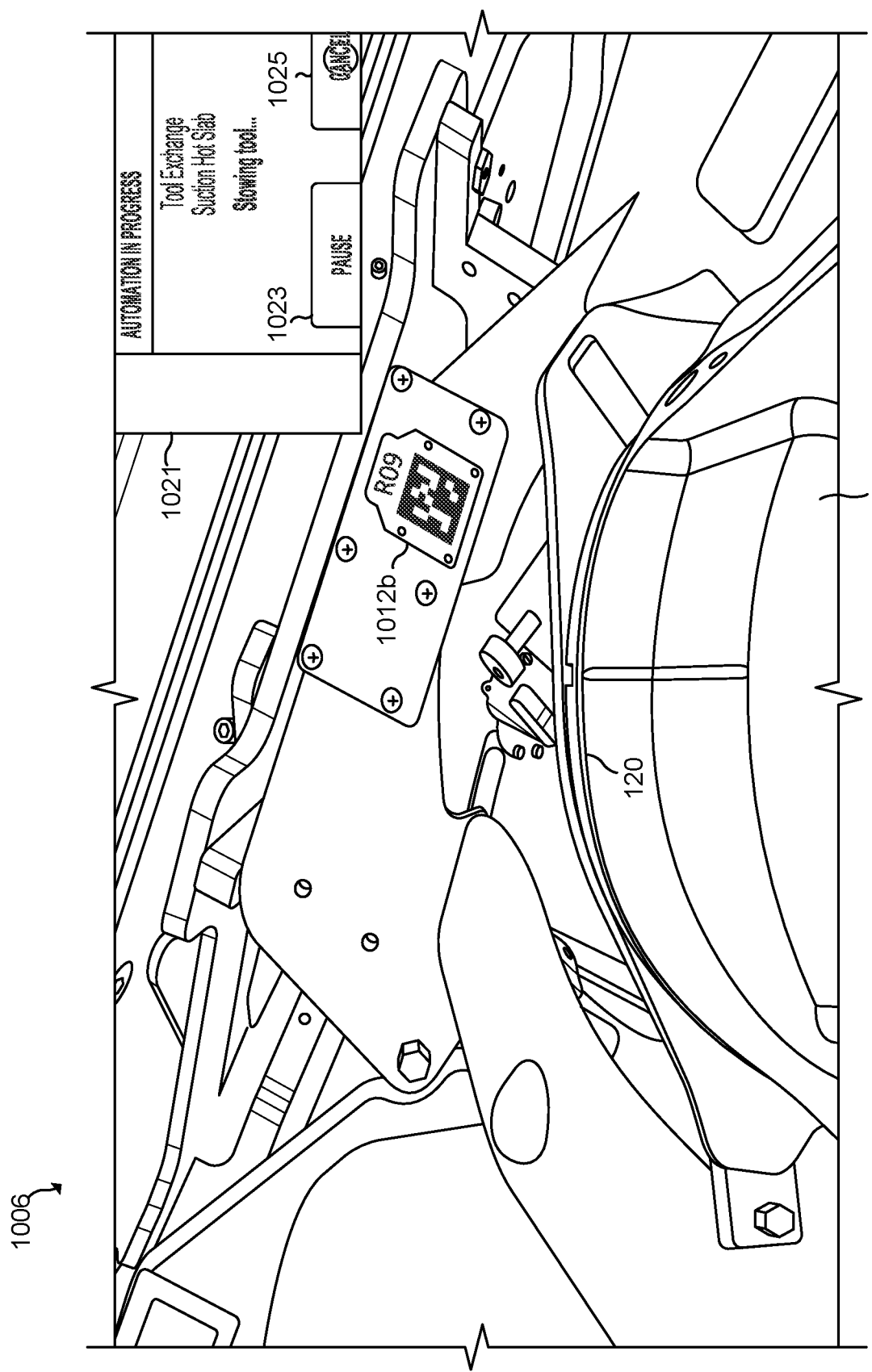
FIG. 11 another example view of a user interface.
Figure 12:
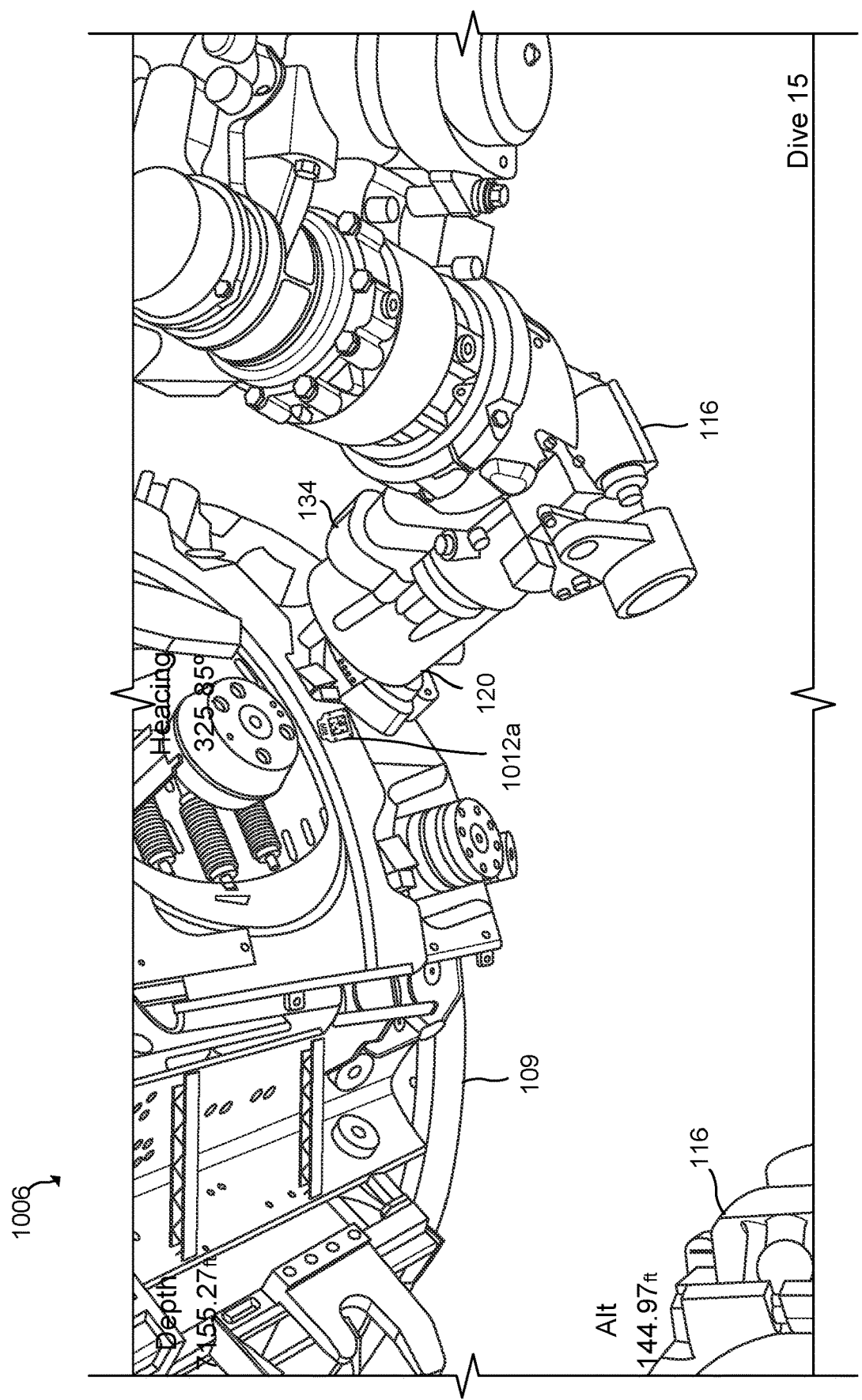
FIG. 12 shows another example view of a user interface.

FIGS. 10, 11, and 12 illustrate an example sequence of operations that are performed by the ROV 102 while a live video stream is provided to a user interface 1006. The sequence of operations includes reading multiple fiducials to facilitate the multiple operations, and is performed with little or no human intervention. An operator or manager can observe the automated operations of the ROV 102 from the various imaging devices. In other aspects, the automated operations of the ROV 102 can be interrupted or controlled by the operator that is presented with overlaid prompts that facilitate operation of the ROV 102 by push button interactions from the operator at various operations throughout the sequence.

FIG. 10 illustrates the user interface 1006 that shows a live view from the wrist camera 134 with the navigator arm 116 positioned near the tool carousel 109. The ROV 102 is navigated to the tool carousel 109 and the wrist camera 134 is adjusted until the fiducial markers 1012a, 1012b are captured in the video feed.

An operator prompt 1021 is overlaid on the video feed at various times throughout the sequence of operations to facilitate the operations by providing the operator with information regarding the operations being performed and by, at times, providing the operator with the ability to interrupt or change the operations that are occurring by making a selection at the operator prompt 1021. In some aspects, the operator prompt 1021 facilitates a push-button operation of the ROV 102 and the operation sequence. For example, the user interface 1006 includes a prompt to a human operator to initiate the automatic engagement with the interface. The user interface includes a prompt to a human operator to select a fiducial marker from multiple fiducial markers 1012a, 1012b within a field of view on the user interface 1006. Identification of the fiducial markers 1012a, 1012b provides positional information regarding the tool carousel 109 including the tools available at the tool carousel 109 and the position of each of the tools at the tool carousel 109 in relation to at least one of the fiducial markers 1012a, 102b.

As shown in FIG. 10, the operator prompt 1021 includes information regarding the status of the operation, a pause button 1023, and a cancel button 1025. The status information indicates an operation being performed (e.g., tool exchange), an objective of the operation (e.g., exchange for a suction hot stab), and a current status of the operation (e.g., moving arm to position). While the ROV 102 is performing the automated operation, the operator allows the ROV 102 to continue the operation by not selecting either the pause button 1023 or the cancel button 1025. The operator has the option to pause the operation by selecting the pause button 1023 or to cancel the operation by selecting the cancel button 1025.

FIG. 11 illustrates the user interface 1006 from the perspective of the wrist camera 134 with the navigator arm 116 and the tool interchange 120 advanced to engage with the tool carousel 109. In the tool exchange sequence, the operations shown in FIG. 11 occur following the operator allowing the ROV 102 to continue the operation of FIG. 10 by not selecting either the pause button 1023 or the cancel button 1025. The operator prompt 1021 is updated in real time to reflect the current operation, and shows that the operation is stowing the tool.

In this example, the fiducial marker 1012b is read to determine a tool port that is open and is configured to receive the tool that is being exchanged by the ROV 102. The fiducial marker 1012b provides the relative positioning information for the ROV 102 to navigate the manipulator arm 116 into an aligned position to stow the tool in the tool port that is available.

FIG. 12 illustrates the user interface 1006 in which the user interface displays a video feed from the front facing camera 130 (e.g., the camera view from the ROV is changed to be from the front facing camera 130). The manipulator arm 116 is advanced into another tool port that houses a tool for performing another operation. The fiducial marker 1012a is read and utilized for determining which tool port has the required tool, where the tool port is, and the precise relative positioning of the tool and the tool port so that the manipulator arm 116 can navigate to the tool and pick the tool with little to no human intervention. In some aspects, the tool is a torque tool.

After the tool (e.g., torque tool) is picked from the tool carousel 109, the ROV 102 navigates to a subsea target (e.g., such as subsea target 800). At the subsea target, at least one fiducial marker 812a, 812b is read. The known operational information for the control interfaces at the subsea target 800 is accessed when the fiducial markers 812a, 812b are read, and the fiducial markers 812a, 812b operate as a bookmark to the operational information (e.g., number of turns, torque, volume, pressures, pH, etc.) for the specific subsea target 800 that the fiducial markers 812a, 812b are attached to. In response to the reading of the fiducial markers 812a, 812b, the historical operational information for the subsea target 800 that is stored in the database (e.g., the database located at the ROV 102, at the vessel 108, server 110, another location, etc.) is communicated to the user interface 806 for display and the ROV 102 for operation.

The ROV 102 performs operations at the subsea target 800 using the tool that was picked from the tool carousel 109. The operations are performed based on the information provided by the fiducial markers 812a, 812b, including the relative position information of the operable controls at the subsea target 800 and the historical operational information about each of the operable controls at the subsea target 800.

The sequence of operations shown in FIGS. 10, 11, and 12 are performed by the ROV 102 while a live video stream is provided to a user interface 1006. The sequence of operations includes reading multiple fiducials to facilitate the multiple operations, and is performed with little or no human intervention. In some aspects, the automated operations of the ROV 102 can be interrupted or controlled by the operator that is presented with overlaid prompts (e.g., operator prompts 1021) that facilitate operation of the ROV 102 by push button interactions from the operator at various operations throughout the sequence.

Figure 13:
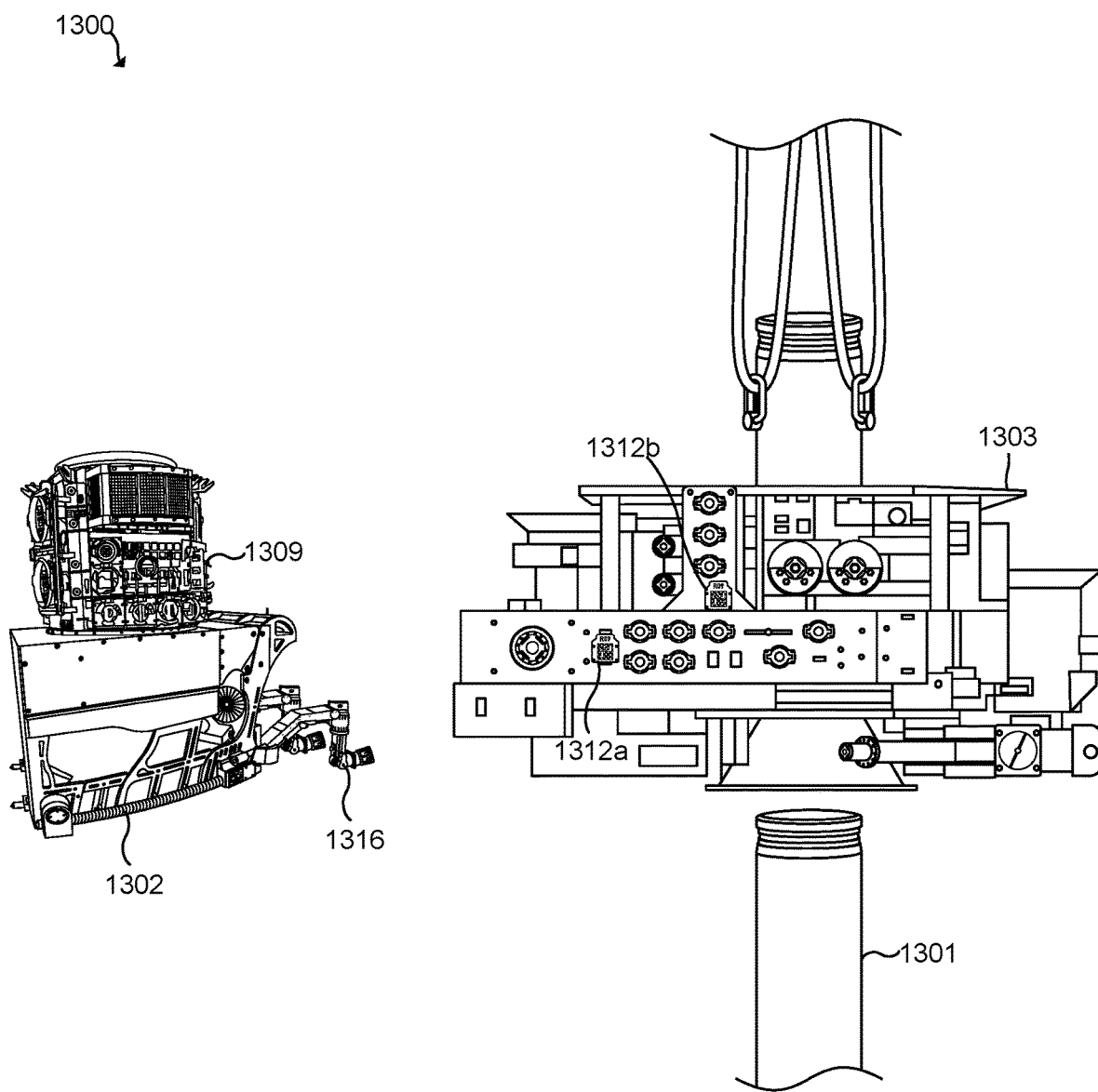
FIG. 13 shows a perspective view of another example system for subsea exploration and production.

Referring now to FIG. 13, an example system 1300 that facilitates the installation and orientation of subsea assets is shown. The example system 1300 includes a submersible ROV 1302 (e.g., including the tool carousel 1309), a head 1301 of a subsea well, and a subsea tree 1303. In various example aspects, the ROV 1302 includes one or more features of ROV 102 described above with reference to FIGS. 1-12. The subsea tree 1303 can be lowered (e.g., from the vessel 108) for installation to the wellhead 1301 of the subsea well. The subsea tree 1303 monitors and controls the production of the subsea well, and the subsea tree 1303 manages fluids or gas that is injected into the well, among other operations. The ROV 1302 facilitates the installation of the subsea tree 1303 in the proper position and orientation on the wellhead 1301 of the subsea well by utilizing a plurality of sensors and imaging devices on board the ROV 1302 and along with one or more fiducial markers 1312a, 1312b on the subsea tree 1303.

The system 1300 facilitates installation/orientation of subsea assets (e.g., installation/orientation of the subsea tree 1303) by performing and facilitating an objective determination of positioning and orientation of the subsea assets during installation. The system 1300 utilizes predetermined and tracked orientation information of the ROV 1302 and tracking of fiducial markers 1312a, 1312b of the subsea assets to determine the orientation and positioning of the subsea assets during installation and after installation. The determined orientation and positioning can be used to ensure the orientation and positioning of the subsea assets conform to a predetermined specified orientation and positioning, and/or to provide an objective measure of orientation and positioning that can be logged, monitored over time, and/or utilized in future operations. In some aspects, the determination provides an objective measure of position and/or orientation that is readily repeatable (e.g., the determination involves little or no subjective/human observations).

In various examples, subsea asset (e.g., subsea targets 500, 600, 800) are existing subsea asset that have previously been installed. Measuring a position and/or orientation of a previously installed subsea asset provides a more stable or relatively fixed location of the subsea asset. Subsea assets that are being installed or are yet to be installed are not fixed in position, and determining the orientation and positioning of the uninstalled subsea assets can be used to ensure the orientation and positioning of the subsea assets conform to a predetermined specified orientation and positioning as the subsea asset is being installed and subject to further adjustment, and/or to provide an objective measure of orientation and positioning that can be logged, monitored over time, and/or utilized in future operations.

The ROV 1302 carries a plurality of sensors that monitor, track, and update the orientation and positioning of the ROV 1302 in real time as the ROV 1302 navigates subsea. For example, the ROV 1302 tracks depth, altitude, orientation angles, pitch, roll, yaw, and inclination. The ROV 1302 also tracks and monitors the positioning of the manipulator arms 1316 during operations and automatically navigates the manipulator arms 1316 to engage with operable controls at subsea targets. The ROV 1302 is automatically navigated to the subsea tree 1303, and at least one of the plurality of imaging devices of the ROV 1302 can be directed at the fiducial markers 1312a, 1312b of the subsea tree 1303.

In an example aspect, each fiducial marker 1312a, 1312b is assigned an orientation reference on the fiducial marker 1312a, 1312b. In some aspects, the orientation reference is a known center of the fiducial marker that is independent from the subsea target that the fiducial is attached to. The fiducial markers 1312a, 1312b have a known shape, such as a square shape, and the known center is predetermined based on the known shape of the fiducial marker 1312a, 1312b. The known center of the fiducial marker 1312a, 1312b is unique to each fiducial marker 1312a, 1312b. The known center is utilized by the submersible ROV 1302, or a processor at a remote location, to determine the orientation of the fiducial marker 1312a, 1312b by determining a variety of measurements in relation to the known center. The variety of measurements include a distance detection, an angle measurement, and/or an orientation detection.

The distance detection of the fiducial markers 1312a, 1312b can be based on a field of view from one or more of the imaging devices of the ROV 1302. The distance detection is determined based on a size of the known center and of the fiducial marker 1312a, 1312b. Each of the imaging devices on the ROV 1302 is calibrated to detect the orientation reference (e.g., the known center) of each fiducial marker 1312a, 1312b, and the known center of each fiducial 1312a, 1312b has a size that is correlated to the distance to the fiducial marker 1312a, 1312b. For example, if the imaging devices of the ROV 1302 are further away from the fiducial marker 1312a, 1312b, the size of the known center in the captured image and/or video is smaller than if the imaging devices of the ROV 102 are closer to the fiducial marker 1312a, 1312b. The imaging devices and the ROV 1302 analyze the size of the orientation reference (e.g., the known center) of the fiducial marker 1312a, 1312b in real time during operations of the ROV 1302 to continuously update the distance the ROV 102 is from the fiducial marker 1312a, 1312b.

The angle measurement of the fiducial markers 1312a, 1312b can be measured using one or multiple of the fiducial markers 1312a, 1312b. For example, one of the fiducial markers 1312a, 1312b is a primary marker and one is a secondary marker. In this example, the fiducial marker 1312a is the primary marker and fiducial marker 1312b is the secondary marker. The primary marker (i.e., fiducial marker 1312a) serves as the reference point for the secondary marker (i.e., fiducial marker 1312b). The orientation reference (e.g., the known center) of the fiducial marker 1312a is used to calculate a vector from the known center of the fiducial marker 1312a to the known center of fiducial marker 1312b. The calculated vector between the fiducial marker 1312a and the fiducial marker 1312b is used for both a distance calculation and for an angle measurement between the fiducial markers 1312a, 1312b.

The orientation detection of the fiducial markers 1312a, 1312b can be based on a Cartesian coordinate system of each fiducial marker 1312a, 1312b. A base of the Cartesian coordinate system is positioned at the orientation reference (e.g., known center) of each of the fiducial markers 1312a, 1312b. The orientation reference of the fiducial markers 1312a, 1312b serves as a base that an x-axis, a y-axis, and a z-axis of the Cartesian coordinate system extend from. The three-axis Cartesian coordinate system based at the orientation reference of each of the fiducial markers 1312a, 1312b provides the orientation of the fiducial markers 1312a, 1312b by providing the imaging devices of the ROV 1302 with a three-dimensional reference correlated to each fiducial marker 1312a, 1312b. The imaging devices and the ROV 1302 analyze the orientation of the three-axis Cartesian coordinate system of each fiducial marker 1312a, 1312b from the perspective of the imaging devices of the ROV 1302 in real time during operations of the ROV 1302 to continuously update the orientation of each of the fiducial markers 1312a, 1312b in relation to the ROV 1302.

The ROV 1302 and the imaging sensors analyze the distance detection, the angle measurement, and/or the orientation detection of the fiducial markers 1312a, 1312b in relation to the tracked depth, altitude, orientation angles, pitch, roll, yaw, and/or inclination of the ROV 1302. The ROV 1302 calculates a correlation between the distance detection, the angle measurement, and the orientation detection of the fiducial markers 1312a, 1312b and the tracked depth, altitude, orientation angles, pitch, roll, yaw, and inclination of the ROV 1302 to correlate a real-time objective measurement of orientation and positioning of a subsea target (e.g., subsea tree 1303 during installation) that can be logged, monitored over time, and/or utilized in future operations.

The ROV 1302 monitors, tracks, and updates the orientation and positioning of the ROV 1302 and captures the position and orientation of the fiducial markers 1312a, 1312b. The orientation and positioning of the ROV 1302 and the position and orientation of the fiducial markers 1312a, 1312b are analyzed by one or more processors on board the ROV 1302. The orientation and positioning of the ROV 1302 and the position and orientation of the fiducial markers 1312a, 1312b are communicated to one or more servers, memories, and/or processors elsewhere on the ROV 1302, at a vessel, at a server, and/or at another location remote from the ROV 1302. The information is communicated to and from the ROV 1302 (e.g., in real time) to facilitate operations of the ROV 1302 based on the information. For example, the orientation and positioning of the ROV 1302 and the position and orientation of the fiducial markers 1312a, 1312b determined by one or more processors of the ROV 1302 is communicated to a server that is remote from the ROV 1302 (e.g., at a vessel), the server has one or more processors and a memory that determine an orientation and position of the subsea target (e.g., subsea tree 1303) by calculating a correlation between the distance detection, the angle measurement, and the orientation detection of the fiducial markers 1312a, 1312b and the tracked depth, altitude, orientation angles, pitch, roll, yaw, and inclination of the ROV 1302 to correlate a real-time objective measurement of orientation and positioning of a subsea target (e.g., subsea tree 1303 during installation) that can be logged, monitored over time, and/or utilized in future operations.

The system 1300 is utilized for the installation, monitoring, and operations of various subsea assets including the subsea tree 1303. Examples of subsea assets that can include fiducial markers affixed to them include subsea drilling systems, blow out preventers, conductor housings, tubing heads, umbilical and riser systems, pipelines, flow lines, subsea manifolds, jumper systems, subsea control systems and instrumentation. The system 1300 utilizes one or more fiducial markers (e.g., fiducial markers 1312a, 1312b) affixed to each of the example subsea assets in a similar manner to the fiducial markers 1312a, 1312b to correlate a real-time objective measurement of orientation and positioning of the subsea target that can be logged, monitored over time, and/or utilized in future operations.

In various example aspects, the system 1300 is utilized during the installation of a series of subsea assets to install a completion system. The orientation and positioning of one or more subsea assets are measured (e.g., in series) as the subsea assets are installed. The orientation/position of each subsea asset is compared to specified ranges for the particular asset. In the event the measured orientation/position is within the specified range, the measured orientation/position is logged in a database (e.g., as described above) and a subsequent subsea asset is installed. The process continues until the completion system is fully installed.

In some aspects, the system 1300 is utilized during the installation of more than one (e.g., two or more) pieces of equipment. The system 1300 identifies one or more fiducial markers on each piece of equipment and analyzes the positioning of each piece of equipment. In an example with two pieces of equipment that are spaced apart from each other (e.g., a well head and a tubing head before and/or during installation), the system 1300 and analyze the position of each piece of equipment by analyzing the fiducials on each piece of equipment. The system 1300 analyzes position and orientation information for each piece of equipment and determines the relative distances (e.g., distances in each x, y, x, pitch, roll, yaw) between the pieces of equipment.

For example, the ROV 1302 is navigated to an area for installation or operation of one or more subsea targets such as a well head and a tubing head. The ROV 1302 captures and analyzes one or more fiducial markers on each of the subsea targets. The analysis of the fiducial markers facilitates a determination of the position and orientation information for each subsea target. The position and orientation information for each subsea target is utilized to determine the relative position and orientation of the subsea targets with respect to each other (e.g., distances in each x, y, x, pitch, roll, yaw). The ROV 1302 and the system 1300 can determine that the tubing head is six feet above, 2 feet and a 29 degree heading away from the well head. The relative positioning of the subsea targets is communicated to the vessel (e.g., vessel 108), and instructions can be communicated to the vessel to adjust the positioning of the subsea target (e.g., the tubing head). For example, instructions can be sent from the ROV 1302 to the boom operator to operate the boom in directions and distances to adjust the relative positioning and orientation of the subsea targets as desired based on the relative positioning and orientation analysis. The instructions can be communicated in the form of specific directions regarding distances and directions, or can be communicated as a video feed from the ROV 1302 to the vessel to show the real-time view of the subsea targets that includes an overlay of the relative positioning and orientation information in real time.

The system 1300 advantageously determines the individual positioning and orientation of subsea targets and the relative positioning and orientation of two or more subsea assets while utilizing a singular ROV 1302. While more than one ROV 1302 can be utilized for operations and installation of subsea targets, a singular ROV 1302 is utilized to determine the individual positioning and orientation of subsea targets and the relative positioning and orientation of two or more subsea assets.

Figure 14:
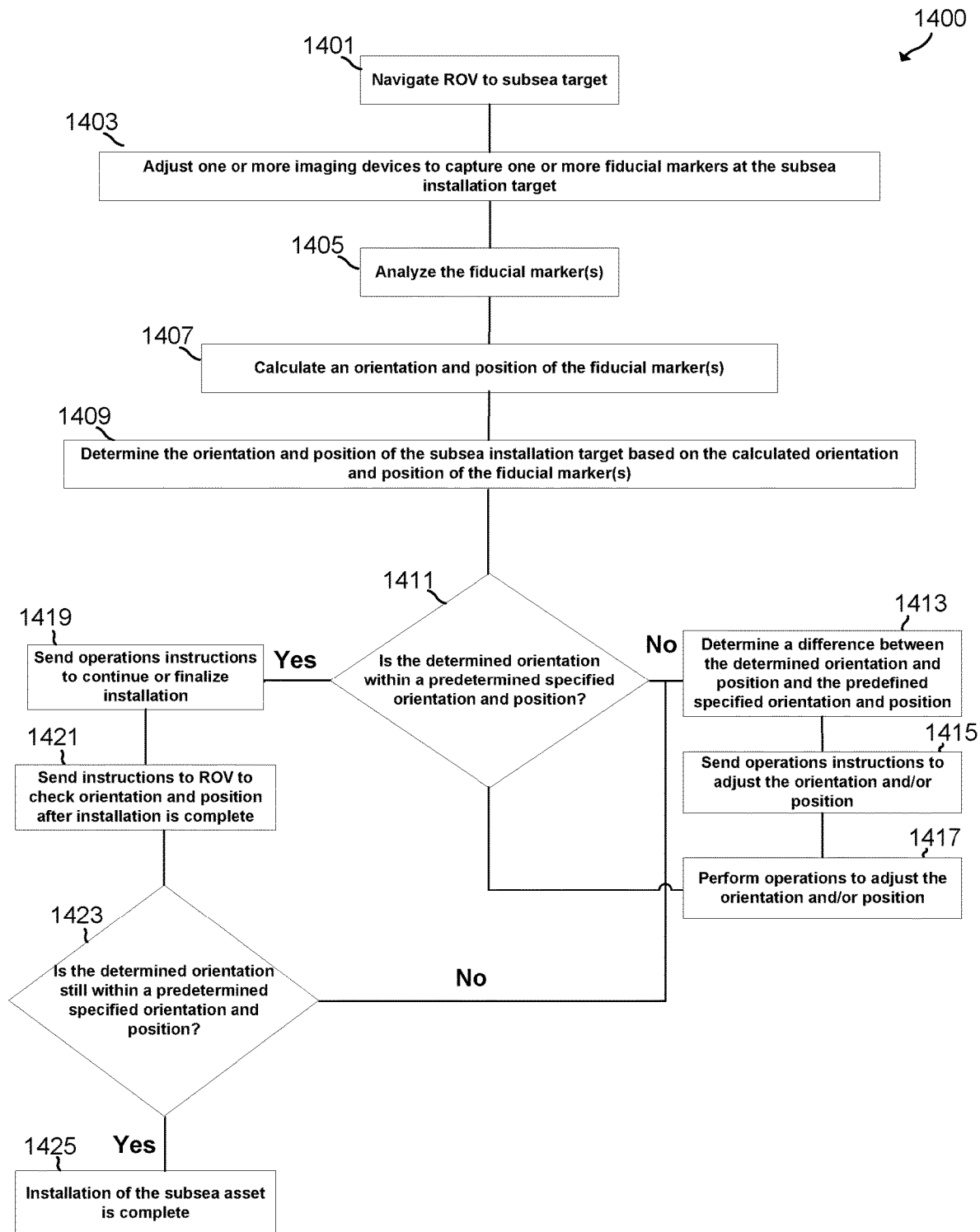
FIG. 14 shows an example process for subsea installation.

FIG. 14 illustrates an example automated subsea process 1400 for subsea installation and production. The process 1400 is utilized for monitoring, controlling, and/or managing of the operations of the ROV (such as ROV 1302) to install subsea assets. In some aspects, the operator or manager can observe the automated operations of the process 1400 at a user interface such as user interface 106, 606, 806. In other aspects, the automated operations of the process 1400 can be interrupted or controlled by the operator.

The process 1400 includes step 1401 of navigating the ROV 1302 to a subsea target. In some aspects, navigation of the ROV 1302 is automated and the subsea target location is provided to the ROV 1302 so that the ROV 1302 can navigate to the subsea target. In some aspects, the navigation of the ROV 1302 can occur with the supervision and occasional intervention of the operator. The step 1401 can include navigation from a vessel to a subsea target or from one subsea target to another subsea target. The step 1401 includes navigating the ROV 1302 to an area of subsea installation such as the subsea tree 1303 being lowered to land on the head 1301 of the subsea well for installation.

The process 1400 includes step 1403 of adjusting one or more imaging devices to capture one or more fiducial markers at the subsea target. Adjustment of the one or more imaging devices includes movement of the ROV 1302, movement of the manipulator arms 1316, movement of the imaging devices (e.g., tilting, rotating, extending), focusing of the imaging devices, and adjustment of the lighting (e.g., turning lights on, turning lights off, changing from a color view to a black and white view, etc.) to facilitate an improved view of the one or more imaging devices. The adjustment of the imaging devices can automatically continue until one or more fiducial markers (e.g., fiducial markers 1312a, 1312b) are recognized and captured.

The process 1400 includes step 1405 of analyzing the fiducial marker. The fiducial marker can be used to obtain position and/or orientation information about the subsea asset it is attached to. In some aspects, the fiducial marker serves as a bookmark to the information regarding the subsea target including an orientation reference of the fiducial marker (e.g., fiducial marker 1312a, 1312b), a shape and size of the fiducial marker, relative positional information, and/or maps of the subsea interface to one or more control interfaces at the subsea target and associated historical operational information for each of the control interfaces at the subsea target. The information regarding the fiducial marker and the subsea target is stored remote from the fiducial marker and the ROV 1302 and can be communicated to a user interface and the ROV 1302 during the process 1400. The fiducial marker provides the location of the information (e.g., in a database stored at the ROV 1302, the vessel 108, the server 110, etc.). The fiducial marker is recognized by the machine vision camera during the installation of subsea assets (e.g., while the tree 1303 is being lowered) and provides an address, bookmark, pointer, etc., to information stored in the memory of the machine vision camera. Alternatively or additionally, the information regarding the fiducial and the subsea target is stored in memory elsewhere on the ROV 1302, at the vessel 108, at the server 110, and/or at another location remote from the ROV 1302. The information is communicated to the user interface and/or the ROV 1302 (e.g., in real time) to facilitate operations of the ROV 1302 based on the information.

The process 1400 includes step 1407 of calculating an orientation and position of the fiducial markers. The step 1407 includes calculating a distance detection, an angle measurement, and an orientation detection for each of the fiducial markers (e.g., fiducial markers 1312a, 1312b). In some aspects, the distance detection of the fiducial marker utilizes the imaging devices and the ROV 1302 analyze the size of the orientation reference (e.g., the known center) of the fiducial marker 1312a, 1312b in real time during operations of the ROV 1302 to continuously update the distance the ROV 1302 is from the fiducial marker 1312a, 1312b. In some aspects, the angle measurement utilizes the orientation reference (e.g., the known center) of the fiducial marker 1312a to calculate a vector from the known center of the fiducial marker 1312a to the known center of fiducial marker 1312b. The calculated vector between the fiducial marker 1312a and the fiducial marker 1312b is used for both a distance calculation and for an angle measurement between the fiducial markers 1312a, 1312b. The orientation detection utilizes the imaging devices and the ROV 1302 to analyze the orientation of the three-axis Cartesian coordinate system of each fiducial marker 1312a, 1312b from the perspective of the imaging devices of the ROV 1302 in real time during operations of the ROV 1302 to continuously update the orientation of each of the fiducial markers 1312a, 1312b in relation to the ROV 1302.

The process 1400 includes the step 1409 of determining the orientation and position of the subsea target based on the calculated orientation and position of the fiducial markers. The ROV 1302 and the imaging sensors analyze the distance detection, the angle measurement, and the orientation detection of the fiducial markers 1312a, 1312b in relation to the tracked depth, altitude, orientation angles, pitch, roll, yaw, and inclination of the ROV 1302. The ROV 1302 calculates a correlation between the distance detection, the angle measurement, and the orientation detection of the fiducial markers 1312a, 1312b and the tracked depth, altitude, orientation angles, pitch, roll, yaw, and inclination of the ROV 1302 to provide a real-time objective measurement of orientation and positioning of a subsea target (e.g., subsea tree 1303 during installation)

The process 1400 includes the step 1411 of determining if the determined orientation and position of the subsea installation target (e.g., the subsea tree 1303) are within predetermined specified orientation and position range(s). In some aspects, the subsea target (e.g., the subsea tree 1303) has a range of acceptable orientations and a range of acceptable positions that are associated with a successful installation of the subsea target. The ranges of acceptable orientations and positions are correlated to tolerance levels for the specific subsea targets to ensure successful and reliable installation of the subsea targets. The information regarding the ranges of acceptable orientations and positions of the subsea target(s) is stored in memory elsewhere on the ROV 1302, at the vessel 108, at the server 110, and/or at another location remote from the ROV 1302. The information is communicated to the user interface and/or the ROV 1302 (e.g., in real time when the fiducial marker associated with the subsea target is read) to facilitate operations of the ROV 1302 based on the information.

The process 1400 includes the step 1413, where if the if the determined orientation and position of the subsea target are outside of at least one of the predetermined specified orientation and position ranges, the step 1413 includes determining a difference between the determined orientation and position and the predefined specified orientation and position. The difference between the determined orientation and position and the predefined specified orientation and position provides an objective measure of an amount of correction in orientation and position to be applied to the subsea target. The amount of correction in orientation and position of the subsea target is converted into operations instructions for the ROV 1302 and the vessel 108 to coordinate operations to correct the orientation and position of the subsea target.

The process 1400 includes the step 1415 of sending operations instructions to adjust the orientation and/or position of the subsea target. The operations include the amount of correction in orientation and position of the subsea target to achieve the predetermined specified orientation and position ranges. The operations instructions are provided to the ROV 1302 and the vessel 108 to coordinate operations to correct the orientation and position of the subsea target. In some aspects, the operations instructions include navigation instructions to the ROV 1302 to engage with the subsea target (e.g., via manipulator arms 1316) at various positions of the subsea target to apply adjustments. The operations instructions include navigation instructions to the vessel 108 to adjust the position of the vessel 108 and/or to actuate controllers on board the vessel 108 to impact the position of the subsea target that is suspended and supported by the vessel 108 before the subsea target is installed.

The process 1400 includes the step 1417 of performing the operations to adjust the orientation and/or position. For example, the ROV 1302 engages with the subsea target (e.g., via manipulator arms 1316) at various positions of the subsea target to apply adjustments to the position and orientation of the subsea target. Additionally and/or alternatively, the vessel 108 navigates to an adjusted position and/or to actuate controllers on board the vessel 108 to impact the position of the subsea target that is suspended and supported by the vessel 108 before the subsea target is installed.

After step 1417, the process returns to step 1411 to determine if the determined orientation and position are within predetermined specified orientation and position range(s). The process 1400 includes the step 1419, where if the if the determined orientation and position are within the predetermined specified orientation and position range, the step 1419 includes sending operations instructions to continue or finalize the installation. The installation can continue by releasing the subsea target from the vessel and attaching the at the installation location (e.g., releasing the subsea tree 1303 onto the head 1301 of the well). In some aspects, the ROV 1302 and the vessel 108 coordinate operations to complete the installation of the subsea asset. For example, the vessel 108 releases the subsea tree 1303 and the ROV 1302 secures the subsea tree 1303 to the head 1301 of the well.

The process 1400 includes the step 1421 of sending instructions to the ROV 1302 to check the orientation and position after the installation is complete. The ROV 1302 is navigated to read the one or more fiducial markers (e.g., fiducial markers 1312a, 1312b) of the subsea target after installation is complete, and the ROV 1302 analyzes the position and orientation of the fiducial markers and associated subsea targets. In some aspects, the position and orientation of the fiducial markers is analyzed in a same or similar manner as described above in reference to steps 1405, 1407, and 1409.

The process 1400 includes the step 1423 of determining if the determined orientation and position of the subsea target are still within the predetermined specified orientation and position ranges. If they are, the process 1400 proceeds to step 1425 that completed the installation of the subsea asset. If at step 1423, the determined orientation and position are outside of the predetermined specified orientation and position range, the process 1400 proceeds to step 1413 and continues through the process 1400 to correct the installation orientation and position of the subsea asset.

While this specification contains many specific implementation details, these should not be construed as limitations on the scope of the disclosed technology or of what may be claimed, but rather as descriptions of features that may be specific to particular aspects of particular disclosed technologies. Certain features that are described in this specification in the context of separate aspects can also be implemented in combination in a single aspect in part or in whole. Conversely, various features that are described in the context of a single aspect can also be implemented in multiple aspects separately or in any suitable subcombination. For example, features described in the context of an example, end effector, arm, or other feature, can be used in combination with one or more other end effectors, arms, or other features. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular aspects of the subject matter have been described. Other aspects are within the scope of the following claims.

What is claimed is:

1. A subsea equipment operating and management system for operating and managing an item of subsea equipment using a submersible ROV, comprising:
    a fiducial marker;
    a submersible ROV, the submersible ROV comprising a manipulator arm and a sensor, the submersible ROV configured to obtain fiducial data from the fiducial marker via the sensor; and
    a processor and memory with instructions stored on the memory operable to cause the system to perform operations comprising:
        monitor an orientation and position of the ROV;
        calculate an orientation and position of the fiducial marker;
        determine a first orientation and position of the item of subsea equipment based on the orientation and position of the fiducial marker and the orientation and position of the ROV;
        determine if the orientation and position of the item of subsea equipment is within a specified orientation and position range;
        send operations instructions to at least one of the ROV and a vessel to adjust the orientation and position of the item of subsea equipment.

2. The subsea equipment operating and management system of claim 1, wherein the item of subsea equipment comprises a subsea tree.

3. The subsea equipment operating and management system of claim 1, wherein the item of subsea equipment comprises a conductor housing.

4. The subsea equipment operating and management system of claim 1, wherein the item of subsea equipment comprises a tubing head.

5. The subsea equipment operating and management system of claim 1, wherein the sensor is a machine vision camera.

6. The subsea equipment operating and management system of claim 1, the operations comprising:
   operate at least one of the ROV and the vessel to adjust the orientation and position of the item of subsea equipment; and
   after the item of subsea equipment has been adjusted, determine whether the item of subsea equipment is within a specified orientation.

7. The subsea equipment operating and management system of claim 1, the operations comprising:
   determine, responsive to a determination that the item of subsea equipment is not within the specified orientation, a difference between the determined orientation and position and the specified orientation and position.

8. The subsea equipment operating and management system of claim 1, the operations comprising:
   after the item of subsea equipment has been installed, determine whether the installed subsea target is within a specified orientation.

9. The subsea equipment operating and management system of claim 8, the operations comprising:
   determine, responsive to a determination that the item of subsea equipment is not within the specified orientation, a difference between the determined orientation and position and the specified orientation and position.

10. The subsea equipment operating and management system of claim 8, the operations comprising:
    determine a second orientation and position of the item of subsea equipment based on the orientation and position of the fiducial marker and the orientation and position of the ROV at a second time subsequent to the first orientation and position.

11. The subsea equipment operating and management system of claim 10, the operations comprising:
    determine a difference between the first orientation and the second orientation of the item of subsea equipment.

12. The subsea equipment operating and management system of claim 11, wherein the item of subsea equipment is a blow out preventer (BOP).

13. A method of performing a subsea operation, comprising:
    capturing one or more fiducial markers at an uninstalled subsea target by an imaging device of a submersible ROV;
    monitoring an orientation and position of the ROV;
    calculating an orientation and position of the fiducial marker;
    determining an orientation and position of the uninstalled subsea target based on the orientation and position of the fiducial marker and based on the orientation and position of the ROV; and
    determining if the orientation and position of the uninstalled subsea target is within a specified orientation and position range;
    determining, responsive to a determination that the uninstalled subsea target is not within the specified orientation, a difference between the determined orientation and position and the specified orientation and position; and
    sending operations instructions to at least one of the ROV and a vessel to adjust the orientation and position of the uninstalled subsea target.

14. The method of claim 13, further comprising:
    performing the operations instructions to adjust the orientation and position of the uninstalled subsea target.

15. The method of claim 13, further comprising:
    sending, responsive to a determination that the uninstalled subsea target is within the specified orientation and position range, operations instructions to finalize installation of the subsea target.

16. The method of claim 13, wherein calculating the orientation and position of the fiducial marker comprises detecting a distance to the fiducial marker, calculating an angle of the fiducial marker in relation to a primary fiducial marker, and detecting an orientation of the fiducial marker.

17. The method of claim 16, wherein calculating the orientation and position of the fiducial marker comprises correlating the detected distance, angle, and orientation of the fiducial marker to one or more tracked ROV navigation parameters.

18. The method of claim 17, wherein the tracked ROV navigation parameters include at least one of a depth, an altitude, an orientation angle, a pitch, a roll, a yaw, and an inclination of the ROV.

19. The system of claim 1, wherein the item of subsea equipment is a subsea tree, and the operations comprise:
    determine, responsive to a determination that the subsea tree is not within the specified orientation, a difference between the determined orientation and position and the specified orientation and position, wherein send operations instructions to at least one of the ROV and a vessel to adjust the orientation and position of the item of subsea equipment comprises instructions to adjust the orientation and position based on the determined difference; and
    after the item of subsea equipment has been installed, determine whether the installed subsea target is within a specified orientation.

20. The system of claim 1, wherein the system includes a second item of subsea equipment that comprises a tubing hanger, and the operations comprise:
    determine a first orientation and position of the tubing hanger based on the orientation and position of the fiducial marker and the orientation and position of the ROV;
    determine if the orientation and position of the tubing hanger is within a specified orientation and position range;
    send operations instructions to at least one of the ROV and a vessel to adjust the orientation and position of the tubing hanger.

21. The method of claim 18, further comprising:
    determining, after the item of subsea equipment has been installed, whether the installed subsea target is within a specified orientation.

\* \* \* \* \*